US012594706B2

(12) United States Patent (10) Patent No.: US 12,594,706 B2
Yagi et al. (45) Date of Patent: Apr. 7, 2026

(54) INJECTION MOLDING CONDITION GENERATION SYSTEM AND METHOD

(71) Applicant: Hitachi, Ltd., Tokyo (JP)

(72) Inventors: Daisuke Yagi, Tokyo (JP); Ryotaro Shimada, Tokyo (JP); Kan Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 18/266,373

(22) PCT Filed: Dec. 2, 2021

(86) PCT No.: PCT/JP2021/044319
§ 371 (c)(1),
(2) Date: Jun. 9, 2023

(87) PCT Pub. No.: WO2022/195974
PCT Pub. Date: Sep. 22, 2022

(65) Prior Publication Data
US 2024/0042665 A1 Feb. 8, 2024

(30) Foreign Application Priority Data

Mar. 15, 2021 (JP) ................................. 2021-041829

(51) Int. Cl.
*G05B 11/00* (2006.01)
*B29C 45/76* (2006.01)
(Continued)

(52) U.S. Cl.
CPC .......... *B29C 45/78* (2013.01); *B29C 45/7653* (2013.01); *B29C 45/7686* (2013.01);
(Continued)

(58) Field of Classification Search
CPC . B29C 45/78; B29C 45/7653; B29C 45/7686; B29C 45/77; B29C 2945/76498;
(Continued)

(56) References Cited

U.S. PATENT DOCUMENTS

2002/0055806 A1* 5/2002 Brown ................ B29C 45/7686
700/197
2008/0102147 A1* 5/2008 Shioiri ................ B29C 45/7686
425/148

(Continued)

FOREIGN PATENT DOCUMENTS

AT 519096 A4 4/2018
DE 102017130997 A1 6/2018
(Continued)

OTHER PUBLICATIONS

German Office Action issued on Aug. 20, 2024 for German Patent Application No. 112021005389.2.

(Continued)

*Primary Examiner* — Aleksey Olshannikov
(74) *Attorney, Agent, or Firm* — Volpe Koenig

(57) ABSTRACT

An injection molding condition generation system improves the quality of injection molding. The injection molding condition generation system acquires a material property value of a resin material and an injection molding condition using the first resin material based on a target value of a quality parameter related to a quality of a molded article, the first material property value, and a predetermined relational expression. The predetermined relational expression indicates a relation among the material property value of the resin material, a plurality of injection molding conditions input to an injection molding machine, and a quality parameter related to the quality of the molded article molded by the injection molding machine based on the material property value and the injection molding conditions, and is generated (Continued)

based on data accumulated in the memory in association with the material property value of the resin material, the injection molding conditions, and the quality parameter.

15 Claims, 17 Drawing Sheets

(51) Int. Cl.
| | | |
|---|---|---|
| *B29C 45/77* | (2006.01) | |
| *B29C 45/78* | (2006.01) | |

(52) U.S. Cl.
CPC .... *B29C 45/77* (2013.01); *B29C 2945/76498* (2013.01); *B29C 2945/76531* (2013.01); *B29C 2945/76545* (2013.01); *B29C 2945/76939* (2013.01)

(58) Field of Classification Search
CPC ........... B29C 2945/76531; B29C 2945/76545; B29C 2945/76939; B29C 2945/76936; B29C 2945/76949; B29C 2945/76979; B29C 45/76
See application file for complete search history.

(56) References Cited

U.S. PATENT DOCUMENTS

| | | | |
|---|---|---|---|
| 2015/0115491 A1 | 4/2015 | Altonen et al. | |
| 2018/0178430 A1 | 6/2018 | Stoehr et al. | |
| 2018/0203431 A1 | 7/2018 | Stoehr et al. | |
| 2020/0307053 A1 | 10/2020 | Shimada et al. | |
| 2022/0288854 A1 * | 9/2022 | Kothari | ................... G06F 30/20 |
| 2023/0010715 A1 * | 1/2023 | Kimura | ............. G05B 13/0265 |

FOREIGN PATENT DOCUMENTS

| | | | |
|---|---|---|---|
| DE | 102020209479 A1 | 2/2022 | |
| JP | 2006-289874 A | 10/2006 | |
| JP | 2016-527109 A | 9/2016 | |
| JP | 2017-119425 A | 7/2017 | |
| JP | 2020-163825 A | 10/2020 | |
| WO | 9609926 A1 | 4/1996 | |
| WO | WO-2020100726 A1 * | 5/2020 | ............. B29C 45/76 |

OTHER PUBLICATIONS

German Official communication issued on Jan. 9, 2026 for German Patent Application No. 112021005389.2.
German Opposition Brief issued on Dec. 19, 2025 for German Patent Application No. 112021005389.2.
Michaeli et al., "Quality Control in the Injection Molding of Recycled Materials", Plastverarbeiter, 44th year, Issue No. 10, 1993, 10 pages.

* cited by examiner

FIG. 7

| LOT ID | PRESSURE SENSOR | | | | RESIN TEMPERATURE SENSOR | |
|---|---|---|---|---|---|---|
| | PEAK VALUE | MAXIMUM DIFFERENTIAL VALUE | INTEGRAL VALUE UP TO PEAK VALUE | INTEGRAL VALUE FROM PEAK VALUE | PEAK VALUE | · · · |
| LOT P | 56.1 | 2031 | 31.1 | 194.6 | 102.8 | · · · |
| LOT Q | 38.3 | 2078 | 21.2 | 158.2 | 117.2 | · · · |
| LOT R | 38.9 | 2160 | 21.3 | 160.2 | 113.7 | · · · |

EIGHT DIMENSIONS
IN TOTAL

FIG. 8

| # | MOLD CLAMPING PRESSURE [t] | MOLD TEMPERATURE [°C] | MOLDING NOZZLE TEMPERATURE [°C] | INJECTION SPEED [mm/s] | PRESSURE-HOLDING PRESSURE [kg/m²] | V-P SWITCHING POSITION [mm] | COOLING TIME [s] | MATERIAL | WEIGHT [g] |
|---|---|---|---|---|---|---|---|---|---|
| 1 | 120 | 30 | 180 | 40 | 30 | 10 | 35 | LOT P | 62.83 |
| 2 | 120 | 30 | 190 | 80.3 | 45 | 12 | 40 | LOT Q | 64.30 |
| 3 | 120 | 30 | 200 | 120 | 60 | 13 | 45 | LOT R | 66.39 |
| 4 | 120 | 40 | 180 | 40 | 45 | 12 | 45 | LOT R | 64.92 |
| 5 | ... | ... | ... | ... | ... | ... | ... | ... | ... |

FIG. 11

| # | LOT | FEATURE Z1 AFTER DIMENSION REDUCTION | FEATURE Z2 AFTER DIMENSION REDUCTION |
|---|-----|--------------------------------------|--------------------------------------|
| 1 | LOT P | −0.51 | 10.86 |
| 2 | LOT P | −0.24 | 10.54 |
| ⋮ | ⋮ | ⋮ | ⋮ |
| 40 | LOT P | 0.81 | 10.90 |
| 41 | LOT Q | 6.54 | 16.69 |
| 42 | LOT Q | 6.30 | 16.95 |
| ⋮ | ⋮ | ⋮ | ⋮ |
| 80 | LOT Q | 6.69 | 16.76 |
| 81 | LOT R | 10.52 | 3.28 |
| 82 | LOT R | 9.61 | 3.03 |
| ⋮ | ⋮ | ⋮ | ⋮ |
| 120 | LOT R | 10.62 | 3.83 |

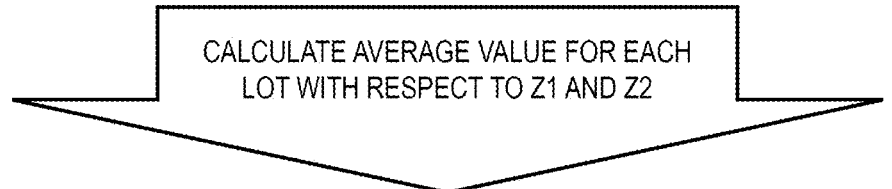

CALCULATE AVERAGE VALUE FOR EACH LOT WITH RESPECT TO Z1 AND Z2

FEATURE DATA SET AFTER DIMENSION REDUCTION

| LOT | FEATURE Z1 AFTER DIMENSION REDUCTION (AVERAGE VALUE) | FEATURE Z2 AFTER DIMENSION REDUCTION (AVERAGE VALUE) |
|-----|------------------------------------------------------|------------------------------------------------------|
| LOT P | 0.5 | 10.6 |
| LOT Q | 6.6 | 16.6 |
| LOT R | 10.2 | 3.4 |

FIG. 12

| # | MOLD CLAMPING PRESSURE [t] | MOLD TEMPERATURE [°C] | MOLDING NOZZLE TEMPERATURE [°C] | INJECTION SPEED [mm/s] | PRESSURE-HOLDING PRESSURE [kg/m²] | V-P SWITCHING POSITION [mm] | COOLING TIME [s] | FEATURE AFTER DIMENSION REDUCTION: Z | | WEIGHT [g] |
|---|---|---|---|---|---|---|---|---|---|---|
| | | | | | | | | Z1 | Z2 | |
| 1 | 120 | 30 | 180 | 40 | 30 | 10 | 35 | 0.5 | 10.6 | 62.83 |
| 2 | 120 | 30 | 190 | 80.3 | 45 | 12 | 40 | 6.6 | 16.6 | 64.30 |
| 3 | 120 | 30 | 200 | 120 | 60 | 13 | 45 | 10.2 | 3.4 | 66.39 |
| 4 | 120 | 40 | 180 | 40 | 45 | 12 | 45 | 10.2 | 3.4 | 64.92 |
| 5 | ... | ... | ... | ... | ... | ... | ... | ... | ... | ... |

FIG. 14

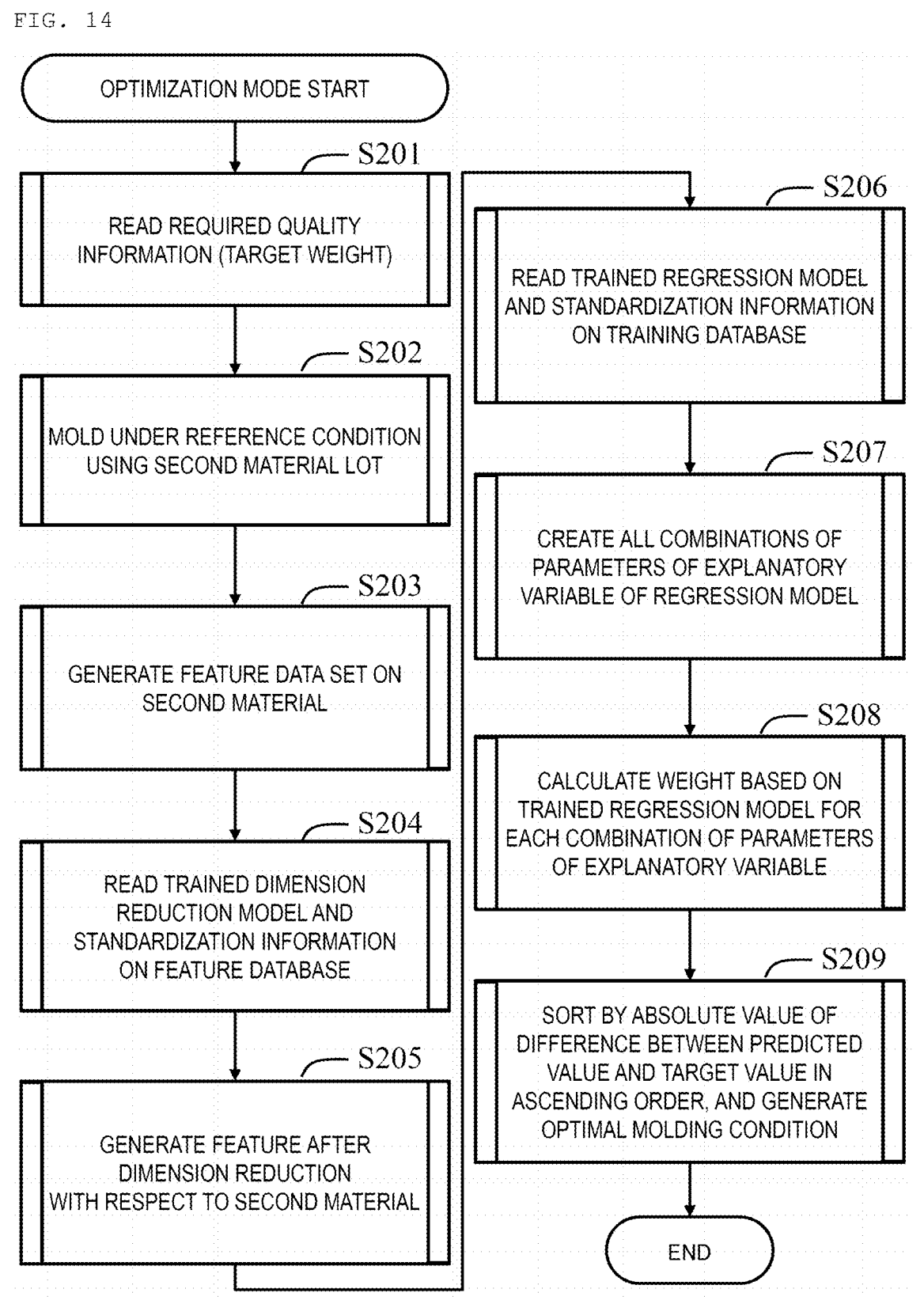

```
                    ┌─────────────────────────────┐
                    │   OPTIMIZATION MODE START    │
                    └─────────────────────────────┘
                                  │
                                  │      ┌─ S201
                                  ▼
         ┌──────────────────────────────────────┐
         │        READ REQUIRED QUALITY          │
         │    INFORMATION (TARGET WEIGHT)        │
         └──────────────────────────────────────┘
                                  │
                                  │      ┌─ S202
                                  ▼
         ┌──────────────────────────────────────┐
         │  MOLD UNDER REFERENCE CONDITION       │
         │    USING SECOND MATERIAL LOT          │
         └──────────────────────────────────────┘
                                  │
                                  │      ┌─ S203
                                  ▼
         ┌──────────────────────────────────────┐
         │      GENERATE FEATURE DATA SET ON     │
         │           SECOND MATERIAL             │
         └──────────────────────────────────────┘
                                  │
                                  │      ┌─ S204
                                  ▼
         ┌──────────────────────────────────────┐
         │      READ TRAINED DIMENSION           │
         │        REDUCTION MODEL AND            │
         │   STANDARDIZATION INFORMATION         │
         │        ON FEATURE DATABASE            │
         └──────────────────────────────────────┘
                                  │
                                  │      ┌─ S205
                                  ▼
         ┌──────────────────────────────────────┐
         │        GENERATE FEATURE AFTER         │
         │         DIMENSION REDUCTION           │
         │  WITH RESPECT TO SECOND MATERIAL      │
         └──────────────────────────────────────┘
```

S206

READ TRAINED REGRESSION MODEL
AND STANDARDIZATION INFORMATION
ON TRAINING DATABASE

S207

CREATE ALL COMBINATIONS OF
PARAMETERS OF EXPLANATORY
VARIABLE OF REGRESSION MODEL

S208

CALCULATE WEIGHT BASED ON
TRAINED REGRESSION MODEL FOR
EACH COMBINATION OF PARAMETERS
OF EXPLANATORY VARIABLE

S209

SORT BY ABSOLUTE VALUE OF
DIFFERENCE BETWEEN PREDICTED
VALUE AND TARGET VALUE IN
ASCENDING ORDER, AND GENERATE
OPTIMAL MOLDING CONDITION

END

| # | PARAMETER RELATED TO MOLDING CONDITION | | | | | | | PARAMETER RELATED TO MATERIAL INFORMATION (FIXED) | |
| | MOLD CLAMPING PRESSURE [t] | MOLD TEMPERATURE [°C] | MOLDING NOZZLE TEMPERATURE [°C] | INJECTION SPEED [mm/s] | PRESSURE-HOLDING PRESSURE [kg/m²] | V-P SWITCHING POSITION [mm] | COOLING TIME [s] | FEATURE AFTER DIMENSION REDUCTION: Z | |
| | | | | | | | | Z1 | Z2 |
|---|---|---|---|---|---|---|---|---|---|
| 1 | 120 | 30 | 180 | 40 | 30 | 10 | 30 | 0.38 | −4.0 |
| 2 | 120 | 30 | 180 | 40 | 30 | 10 | 31 | 0.38 | −4.0 |
| 3 | 120 | 30 | 180 | 120 | 30 | 10 | 32 | 0.38 | −4.0 |
| 4 | 120 | 30 | 180 | 40 | 30 | 10 | 33 | 0.38 | −4.0 |
| ... | ... | ... | ... | ... | ... | ... | ... | ... | ... |

INJECTION MOLDING CONDITION GENERATION SYSTEM AND METHOD

TECHNICAL FIELD

The present invention relates to an injection molding condition generation system and method.

BACKGROUND ART

In an injection molding process, various factors such as a plurality of injection molding conditions input to a molding machine and variation in material property of a resin affect a quality of a molded article. Therefore, adjusting the molding conditions in order to stabilize the quality of the molded article is not easy and requires a technique and time of a skilled worker. To solve this problem, a method for optimizing an injection molding condition independent of a worker has been studied (PTL 1).

In the method described in PTL 1, an injection molding controller that provides a control signal for partially determining an injection molding pressure in an injection molding process is connected to an injection molding machine. A first control signal from a pressure control output is measured at a first time in an injection molding cycle. A second control signal from the pressure control output is measured at a second time in a subsequent injection molding cycle. A control signal for pressure at a third time in an injection molding cycle is adjusted based on a result of comparison between the first control signal and the second control signal. That is, in PTL 1, by measuring a change in material property during the injection molding process as a change in control signal from the controller, and adjusting the pressure based on the change in control signal, it is possible to control the injection molding condition (pressure) in consideration of the change in material property without depending on the operator.

CITATION LIST

Patent Literature

PTL 1: JP-A-2016-527109

SUMMARY OF INVENTION

Technical Problem

The method described in PTL 1 has a premise that the pressure is sequentially adjusted for each cycle during an injection molding operation. Therefore, in the method described in PTL 1, a special controller for measuring the control signal from the pressure control output during the injection molding operation and performing pressure control according to the measured value, and development for normally connecting the controller and the injection molding machine are required and an additional development and man-hours are required.

A relation between the molding conditions in injection molding and the quality is affected by the material property of the resin. For example, since even materials of the same type (for example, polypropylene) are different in fluidity depending on a grade unit or a supplier unit, even if the same molding condition is input, a behavior of the resin in a mold greatly varies, and the quality of the molded article also varies.

Here, in recent years, due to a problem of marine pollution caused by plastic waste and a transfer prohibition measure of plastic waste from China and Southeast Asia, much attention has been focused on utilization of recycled plastic materials. Taxation and regulations on use of virgin materials in some regions centered on Europe are also studied, and use of recycled materials by manufacturers that manufacture products using plastics is an urgent issue. However, since recycled materials have a large variation in the material property as compared with virgin materials due to a thermal history during the molding, deterioration due to an environment during use, and contamination of foreign matters and the thermal history during recycling, the variation in the quality of molded articles becomes larger than that of the virgin materials.

FIG. 17 is a graph showing a comparative example for clarifying an advantage of embodiments to be described later, and is not background art. FIG. 17 shows distribution of weight of molded articles when molding is performed using three recycled materials of lot A, lot B, and lot C, for example. A horizontal axis in FIG. 17 represents the weight of the molded article, and a vertical axis in FIG. 17 represents a probability density. FIG. 17 shows the distribution of weight of molded articles when three recycled materials having different delivery times are molded with the same mold and injection molding machine and the same molding condition.

Hereinafter, a difference due to the delivery time will be referred to as a lot. In FIG. 17, the number of molded articles per lot is 40. The distributions of weight of molded articles shown in FIG. 17 are all normalized by the number of molded articles.

From FIG. 17, even when the molding is performed under the same molding conditions, weight variation between lots is sufficiently larger than the variation in the lot. Therefore, it can be confirmed that, in the recycled materials, the difference in material property between delivery lots affects the relation between the molding condition and the quality.

With respect to the influence of the material property of the resin, PTL 1 measures the change in material property during the injection molding operation as the change in control signal from the controller. In PTL 1, the adjustment according to the change in material property is performed by controlling the pressure of the injection molding condition based on the change in control signal from the controller. However, in control of only the pressure, when a temperature property and the fluidity of the resin greatly change, an adjustment amount of the pressure is increased. Therefore, in the method described in PTL 1, in a case in which the pressure is too low, there is a high possibility of occurrence of a short shot, and in a case in which the pressure is too high, there is a high possibility of occurrence of an appearance defect such as a burr.

The invention has been made in view of the above problems, and an object of the invention is to provide an injection molding condition generation system and method capable of improving a quality of injection molding.

Solution to Problem

In order to solve the above problems, an injection molding condition generation system according to the invention is an injection molding condition generation system for generating an injection molding condition using a computer. The computer includes a processor and a memory used by the processor. When the processor acquires a first material property value of a first resin material, the processor generates the injection molding condition of injection molding using the first resin material based on a target value of a quality parameter related to a quality of a molded article, the first material property value, and a predetermined relational expression. The predetermined relational expression is an expression indicating a relation among the material property value of the resin material, a plurality of injection molding conditions input to an injection molding machine, and a quality parameter related to the quality of the molded article molded by the injection molding machine based on the material property value and the injection molding conditions, and is generated based on data accumulated in the memory in association with the material property value of the resin material, the injection molding conditions, and the quality parameter.

Advantageous Effects of Invention

According to the invention, it is possible to obtain an injection molding condition suitable for a material property value of a resin material used in an injection molding machine and a quality of a molded article.

BRIEF DESCRIPTION OF DRAWINGS

FIG. 7 is a diagram showing an example of a feature extraction result.

FIG. 8 is a diagram showing a process data set.

FIG. 11 is a diagram showing an example of the feature data set after dimension reduction.

FIG. 12 is a diagram showing an example of a training data set.

FIG. 14 is a flowchart of an optimization mode.

DESCRIPTION OF EMBODIMENTS

Hereinafter, an embodiment according to the invention will be described with reference to the drawings. The present embodiment provides a technique for reducing variation in a quality of a molded article due to variation in a material property. An injection molding condition generation system according to the present embodiment does not need to be normally connected to an injection molding machine, and can provide an appropriate injection molding condition to the injection molding machine.

The embodiment described below does not limit the inventions according to the claims, and all of the elements and combinations thereof described in the embodiment are not necessarily essential to the solution of the invention.

The system according to the present embodiment optimizes the injection molding condition according to a material property value of a resin material and a required quality. The system generates in advance, for example, a relational expression indicating a relation of the material property value of the resin material used for injection molding, a plurality of injection molding conditions input to the injection molding machine, and a quality parameter related to the quality of the molded article molded by the injection molding machine based on the resin material and the injection molding condition, based on accumulated data in association with the material property value, the injection molding condition, and the quality parameter that were obtained during molding in the past; acquires a first material property value of a first material; and generates an injection molding condition suitable for the first material based on the first material property value, a target value of the quality parameter, and the predetermined relational expression.

According to the present embodiment, even when a material property of the resin changes, it is possible to obtain an optimum molding condition for stabilizing a molding quality regardless of the skill of an operator and without requiring real-time control during the injection molding process.

Embodiment 1

Figure 1:
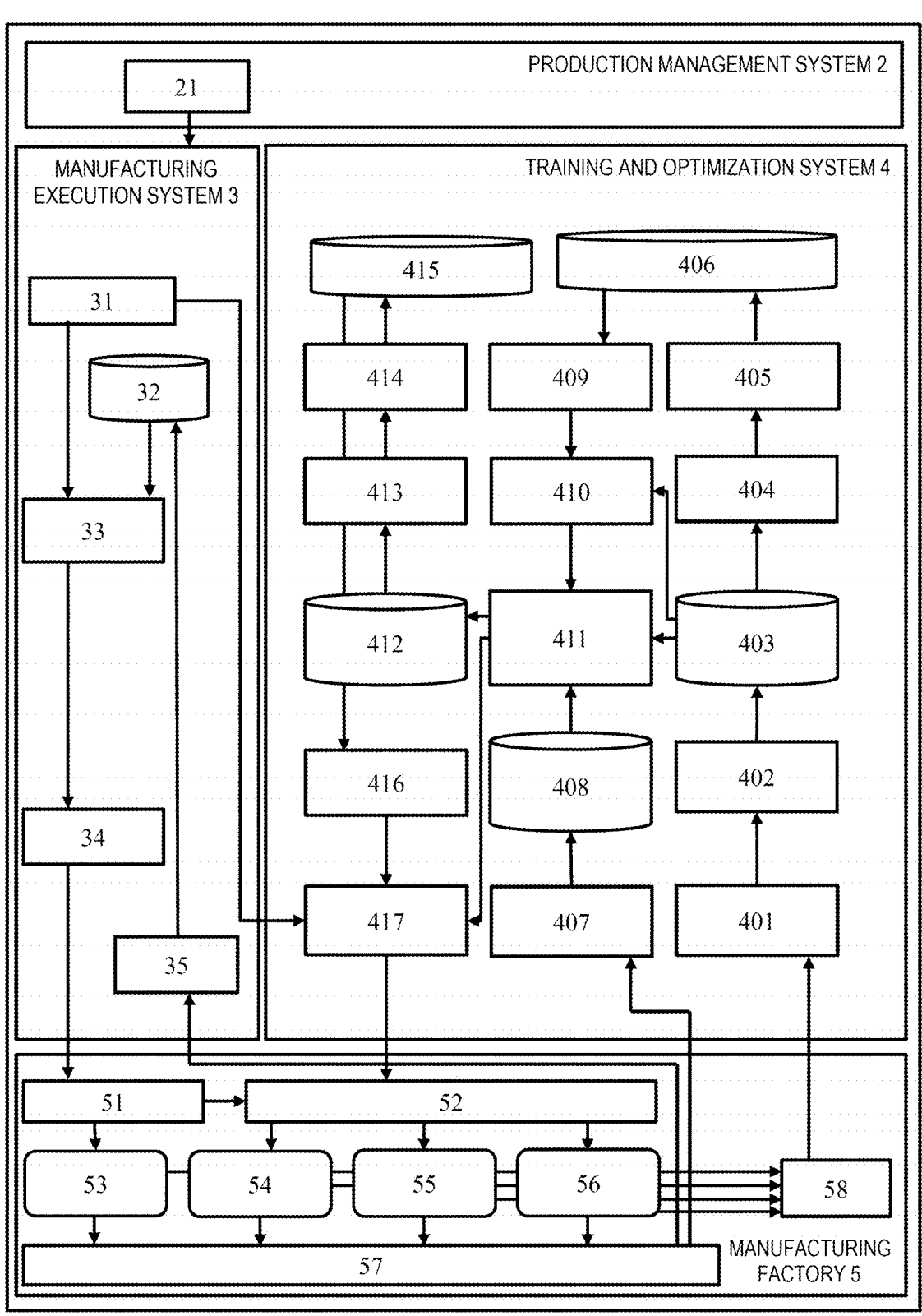
FIG. 1 is a functional block diagram of a molding condition optimization system of an injection molding machine.

Embodiment 1 will be described with reference to FIGS. 1 to 16. FIG. 1 shows a functional block diagram of a system 1 that generates a molding condition for an injection molding machine.

The injection molding condition generation system 1 includes, for example, a production management system 2, a manufacturing execution system 3, a training and optimization system 4, and a manufacturing factory 5. Some or all of functions of the injection molding condition generation system 1 to be described below may be configured as software, may be implemented by cooperation of software and hardware, or may be implemented using hardware having a fixed circuit. At least a part of the functions of the production management system 2, the manufacturing execution system 3, and the manufacturing factory 5 may be executed by an operator.

The production management system 2 is a system that manages a production plan, and includes at least a production plan management unit 21. The production plan management unit 21 functions to generate a production plan including production specifications, quantities, periods, and the like, according to an order reception state and a stock state.

The manufacturing execution system 3 is a system that instructs the manufacturing factory 5 to execute production. The manufacturing execution system 3 determines a manufacturing condition based on the production plan generated by the production management system 2, and sends a production instruction including the manufacturing condition to the manufacturing factory 5. The manufacturing condition may include, for example, information for specifying an injection molding machine used for the production (injection molding), information for specifying a mold to be used for the production, information for specifying a material to be used for the production, the number of molded articles to be produced, production time, and a required quality.

The manufacturing execution system 3 will be described. The manufacturing execution system 3 includes, for example, a manufacturing condition determination unit 31, a production result memory unit 32, a production result acquisition unit 33, a manufacturing execution instruction unit 34, and a production result recording unit 35.

The manufacturing condition determination unit 31 functions to determine the above manufacturing condition based on the production plan generated by the production plan management unit 21 of the production management system 2. The manufacturing condition determination unit 31 can transmit information on the manufacturing condition to the training and optimization system 4. The information on the manufacturing conditions can include predetermined information on the mold, the injection molding machine, and the material.

The predetermined information includes, for example, a mold capacity and a mold runner configuration. The predetermined information may further include, for example, a required quality of the molded article to be produced, a manufacturing number of a resin material to be used in a supplier unit, and a delivery number of each supplier. In order to optimize the molding condition, the training and optimization system 4 inputs required quality information on the molded article received from the manufacturing condition determination unit 31 to an optimal condition generation unit 417, and generates an optimized molding condition.

The production result memory unit 32 functions to memorize a production result. In the present embodiment, the production result indicates a molding condition at which it is confirmed that a good molded article quality can be obtained with respect to a combination of the injection molding machine, the mold, and the material. The good molded article quality means that the molding quality satisfies the required quality determined in the manufacturing execution system 3.

The production result acquisition unit 33 functions to acquire the production result from the production result memory unit 32. The production result acquisition unit 33 acquires the production result obtained by the mold determined by the manufacturing condition determination unit 31 (hereinafter, referred to as a first mold) and a used material determined by the manufacturing condition determination unit 31 (hereinafter, referred to as a first material) by reading from the production result memory unit 32.

When there is no production result obtained by a combination of the first mold and the first material, the production result acquisition unit 33 requests the manufacturing execution instruction unit 34 to optimize the molding condition based on the combination of the first mold and the first material or to mold based on the optimization result.

The request for the optimization of the molding condition means performing trial molding in the manufacturing factory 5 under an injection molding condition that is a reference set in advance (hereinafter, referred to as a reference condition), inputting information related to the trial molding to the training and optimization system 4, and generating the molding condition that satisfies the required quality.

Examples of the information to be input to the training and optimization system 4 will be described later. In addition, the molding based on the optimization result means that the molding is performed under a molding condition output by the training and optimization system 4, which is expected as a favorable molding condition.

On the other hand, when there is the production result obtained by the combination of the first mold and the first material, the production result acquisition unit 33 requests the manufacturing execution instruction unit 34 to mold based on a manufacturing result or to perform the trial molding for training (hereinafter, referred to as training trial molding).

Here, the training trial molding means performing the injection molding while changing the molding condition, inputting the obtained information to the training and optimization system 4, and storing the obtained data as data for extracting an optimal molding condition. Details of the training trial molding will be described later with reference to FIG. 8.

The manufacturing execution instruction unit 34 functions to instruct the manufacturing execution in the manufacturing factory 5. The manufacturing execution may also be referred to as production. The manufacturing execution instruction includes, for example, the request for optimization of the molding condition input by the production result acquisition unit 33, the request for molding based on the optimization result, the request for molding based on the manufacturing result, and the request for the training trial molding.

The production result recording unit 35 functions to record, in the production result memory unit 32, the molding condition at which it is confirmed that a good molded article quality can be obtained in the manufacturing factory 5. Based on the information indicating the quality result of the molded article, which is acquired from a quality inspection unit 57 of the manufacturing factory 5, the production result recording unit 35 registers, in the production result memory unit 32, the molding condition at which a good molded article quality is obtained.

The manufacturing factory 5 will be described. The manufacturing factory 5 receives the manufacturing execution instruction unit from the manufacturing execution system 3 and executes one or a plurality among injection molding processes 53 to 56. Hereinafter, the injection molding may be abbreviated as "IM".

The manufacturing factory 5 includes, for example, a manufacturing execution unit 51, a plurality of injection molding machines 50 (described later in FIG. 3), a plurality of molds (described later in FIG. 3), a molding condition creation unit 52, and a molded article quality inspection unit 57. Hereinafter, the molded article quality inspection unit 57 may be abbreviated as the quality inspection unit 57.

The manufacturing execution unit 51 executes the injection molding processes based on the manufacturing condition input from the manufacturing execution instruction unit 34 of the manufacturing execution system 3. When the molding based on the production result is required, the manufacturing execution unit 51 executes the injection molding process 53 with respect to a combination of specified mold and material by inputting the production result to the injection molding machine. That is, the injection molding process 53 is an injection molding process performed using a combination of specified mold and material under a molding condition having a result of non-defective product production.

When the training trial molding is required, the manufacturing execution unit 51 issues an instruction of training trial molding to the molding condition creation unit 52. When receiving the instruction of training trial molding from the manufacturing execution unit 51, the molding condition creation unit 52 creates a plurality of molding conditions stored in a training database 412 of the training and optimization system 4 with respect to the combination of specified mold and material. The manufacturing execution unit 51 executes the injection molding process 54 by inputting the plurality of created molding conditions to the injection molding machine while changing the created molding conditions for each predetermined shot unit. That is, the injection molding process 54 is a process of changing the molding conditions for each predetermined shot unit and performing the trial molding according to the molding conditions.

When the molding condition optimization is required, the manufacturing execution unit 51 issues an instruction for molding under the reference condition to the molding condition creation unit 52. When receiving the instruction of molding under the reference condition from the manufacturing execution unit 51, the molding condition creation unit 52 executes the injection molding process 55 with respect to the instructed combination of mold and material by inputting the reference condition specified in advance to the injection molding machine. That is, the injection molding process 55 is a process of performing the injection molding according to the reference condition.

When molding based on the optimization result is required, the manufacturing execution unit 51 instructs the molding condition creation unit 52 to mold based on the optimization result. When receiving an instruction for molding based on the optimization result from the manufacturing execution unit 51, the molding condition creation unit 52 receives, from the training and optimization system 4, the optimized molding condition generated by the optimal condition generation unit 417, and executes the injection molding process 56 with respect to the combination of specified mold and material by inputting the received molding condition to the injection molding machine. That is, the injection molding process 56 is a process of performing the injection molding according to the optimized molding condition.

The quality inspection unit 57 functions to determine whether the quality of the molded article obtained by the injection molding processes is good or bad. The quality of the molded article is evaluated based on, for example, dimensions, warp amount, burrs, scratches, gloss, and color. The quality inspection of the molded article may be automatically performed, may be manually performed by an inspector, or may be performed semi-automatically.

When the quality of the molded article is good, the quality inspection unit 57 outputs the manufacturing condition, the combination of injection molding machine and mold, the molding condition, and the inspection result of the molded article quality in association with each other to the production result recording unit 35 of the manufacturing execution system 3. In addition, when the injection molding processes 54 to 56 are performed, the manufacturing condition, the combination of injection molding machine and mold, the molding condition, and the inspection result of the molded article quality are output to a process data recording unit 407 of the training and optimization system 4 in association with each other.

In the present embodiment, information related to the material property of each used material when the first mold is used is acquired by measuring a physical quantity at a predetermined position in the mold by sensors 58 mounted on the injection molding machines and the molds held in advance in the manufacturing factory 5 and outputting the physical quantity to a sensor information recording unit 401 of the training and optimization system 4. Details of the sensor mounted on the mold will be described later with reference to FIG. 4. Here, the information related to the material property means, for example, the fluidity and the material physical properties of the material, and physical quantities correlated with the fluidity and the material physical properties.

A predetermined position of the injection molding machine is, for example, a nozzle tip portion. The predetermined position in the mold is, for example, a resin inflow port of a mold. The physical quantity includes, for example, a pressure of a resin, a temperature of the resin, a speed of the resin, a material property of the resin, and an opening amount of the mold (mold opening amount). The material property is, for example, a density of the resin, a viscosity of the resin, and distribution of fiber length of the resin (in a case of a reinforcing fiber content material). Here, the physical mount most correlated with the fluidity of the material is the viscosity of the resin, and other features correlated to the fluidity calculated based on the pressure, the temperature, and the speed also can be used.

The training and optimization system 4 will be described. The training and optimization system 4 functions to generate an appropriate injection molding condition when there is no production result obtained by the combination of specified mold and resin material. The optimum injection molding condition in the present embodiment means an appropriate injection molding condition.

The training and optimization system 4 functions to generate, with respect to materials without any production result obtained by the combination of first mold and first material in the production result memory unit 32 of the manufacturing execution system 3 and to be subjected to condition optimization (hereinafter, the materials are referred to as a second material), the optimum molding condition for the second material to satisfy the required quality, by inputting the required quality and information obtained by the IM process 54 performed in the past and the IM process 55 using the second material.

The training and optimization system 4 includes, for example, the sensor information recording unit 401, a feature extraction unit 402, a feature database 403, a dimension reduction model training unit 404, a trained dimension reduction model storage unit 405, a trained dimension reduction model memory unit 406, the process data recording unit 407, a process database 408, a dimension reduction model read unit 409, a dimension reduction execution unit 410, a connection unit 411, the training database 412, a regression model training unit 413, a regression model storage unit 414, a trained model memory unit 415, a regression model read unit 416, and the optimal condition generation unit 417.

The sensor information recording unit 401 will be described. The sensor information recording unit 401 functions to record the physical quantity at the predetermined position in the mold, which is acquired by the sensor 58 in the injection molding process 55 performed at the manufacturing factory 5. The feature extraction unit 402 performs feature extraction on the physical quantity temporarily recorded in the sensor information recording unit, and records the extracted feature in the feature database 403 in association with a predetermined material unit, the combination of injection molding machine and mold, and the extracted feature. Here, the predetermined material unit means, for example, a unit for distinguishing materials such as a model number or a lot for each material supplier.

In the present embodiment, a data group recorded in the feature database 403 is referred to as a feature data set. The processing in the feature extraction unit 402 will be described later with reference to FIGS. 6 and 7. When only the predetermined material unit is changed in a state where the combination of injection molding machine and mold is fixed and the molding condition in the injection molding process 55 is fixed, the feature extracted from the physical quantity obtained from the sensor 58 is strongly affected by a change in material information (for example, fluidity or physical property value) between the material units.

Therefore, it is possible to record variation in the material information between the material units as variation between the features. Here, since the feature extracted from the physical quantity obtained from the sensor 58 is affected by a machine difference between the injection molding machine and the mold, the variation in the material information between the material units is stored as the variation between the features. That is, the feature data set is recorded for each combination of injection molding machine and mold. In all feature data sets to be described below, the combination of injection molding machine and mold is fixed.

The dimension reduction model training unit 404 functions to convert a dimension of the feature of the feature data set recorded in the feature database into a lower dimension vector using a dimension reduction model. The dimension after the conversion can be set to any dimension by a user of the training and optimization system. The dimension reduction is an unsupervised learning method in which information on an input vector is extracted to a lower dimension vector than that of the input vector, while maintaining the information as much as possible. Dimension reduction models include, for example, principal component analysis, autoencoder, and UMAP.

In general, by converting a multidimensional vector into a lower dimension vector, it is possible to improve interpretation of the data or generalization performance during the generation of the regression model. By training the dimension reduction model using the feature data set of the feature database 403, a trained dimension reduction model is generated. When the feature data recorded in the feature database is input to the trained dimension reduction model, a vector converted to a rank specified by the user is output.

The trained dimension reduction model storage unit 405 functions to record, in the trained dimension reduction model memory unit 406, the dimension reduction model generated by the dimension reduction model training unit 404.

The process data recording unit 407 will be described. The process data recording unit 407 records the quality of the molded article formed by either one of the injection molding process 54 or the injection molding process 55, the molding condition input to the injection molding machine, the predetermined material unit, and the combination of injection molding machine and mold in the process database 408 in association with each other.

In the present embodiment, a data group recorded in the process database is referred to as a process data set. Similarly to the feature data set, the process data set is also recorded for each combination of injection molding machine and mold. In the process data set to be described below, it is assumed that the combination of injection molding machine and mold is fixed.

The dimension reduction model read unit 409 functions to read the trained dimension reduction model recorded in the trained dimension reduction model memory unit 406. The read dimension reduction model is output to the dimension reduction execution unit 410.

The dimension reduction execution unit 410 functions to reduce the dimension of the feature database using the trained dimension reduction model read from the dimension reduction model read unit 409 with respect to the feature data set read from the feature database 403. Details of a dimension reduction result will be described later with reference to FIGS. 9 to 11. The data set after the dimension reduction is output to the connection 411.

With respect to the process data set in which the feature data set after the dimension reduction associated with the material information output from the dimension reduction execution unit 410, the material information acquired from the process database 408, the molding condition, and the quality of the molded article are associated with each other, the connection unit 411 generates a data set in which the molding condition, the quality of the molded article, and the vector after the dimension reduction correspond to each other (hereinafter, the data set is referred to as a training data set) using the material information as a combination key, and records the training data set in the training database 412.

Here, the connection unit 411 does not necessarily use the feature data set after the dimension reduction, and may combine the feature data set associated with the material information with the process database set from the feature database 403 instead of the feature data set after the dimension reduction to generate the training data set, and record the training data set in the training database 412. In the following description of the present embodiment, a case in which the training data set is generated using the vector after the dimension reduction will be described.

The regression model training unit 413 functions to acquire the training data set from the training database 412, use a regression model with a vector and a molding condition after the dimension reduction as the explanatory variable and with the quality of the molded article as the objective variable, train the regression model for predicting the objective variable based on the explanatory variable, and generate the trained regression model.

In general, the regression model indicates a model (y=f (X)) for predicting an objective variable (y) based on an explanatory variable (X). Parameters in the model are determined by training data. In the description of the present embodiment, the term "regression model" indicates a general regression model, and the term "trained regression model" indicates a regression model in which the parameters of the model are determined by the training data.

In the present embodiment, a regression model such as linear regression, ridge regression, support vector machine, neural network, and random forest regression, or a regression model that is a combination thereof may be used as the regression model. When the regression model to be used can have one or more objective variables as in, for example, the neural network, one or more qualities of the molded article may be selected as the objective variable. Specific training of the regression model will be described later with reference to FIGS. 9 to 13.

The regression model storage unit 414 functions to record, in the trained regression model memory unit 415, the trained regression model generated by the regression model training unit 413. The regression model read unit 416 acquires the trained regression model from the trained regression model memory unit 415, and inputs the trained regression model to the optimal condition generation unit 417.

The optimal condition generation unit 417 functions to generate the molding condition (injection molding condition) for achieving the required quality. The optimal condition generation unit 417 generates an optimal molding condition for achieving the required quality by acquiring the required quality of the molded article from the manufacturing condition determination unit 31, acquiring the trained regression model from the regression model read unit 416, and acquiring the feature data after the dimension reduction for the second material from the connection unit 411. The generation of the optimum molding condition will be described later with reference to FIGS. 14 to 16.

Figure 2:
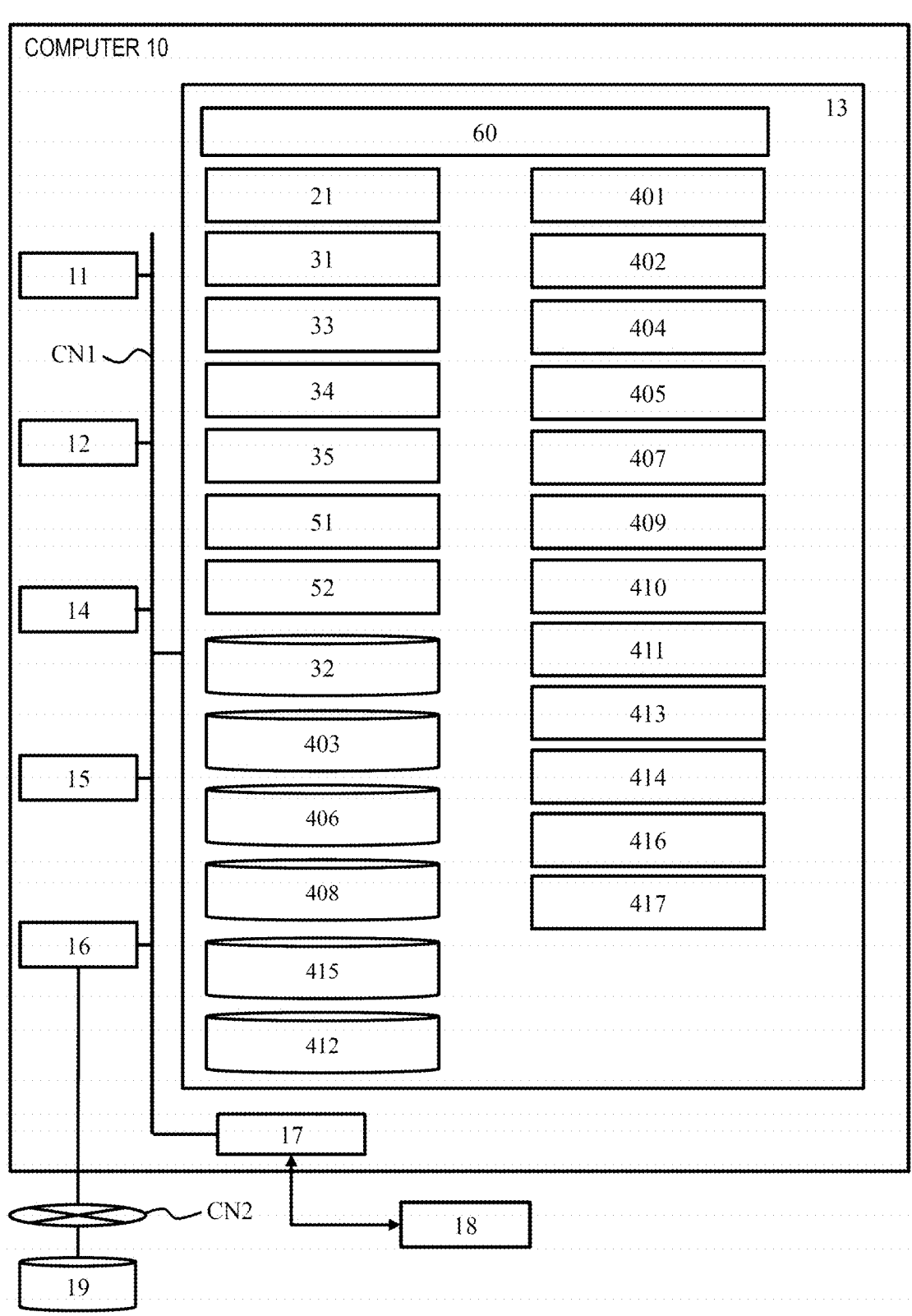
FIG. 2 is a configuration diagram of a computer that can be used for implementing an injection molding condition generation system.

FIG. 2 shows a configuration example of a computer 10 that can be used for implementing the injection molding condition generation system 1. Here, a case in which the injection molding condition generation system 1 is implemented by one computer 10 will be described, but the invention is not limited thereto, and one or more injection molding condition generation systems 1 can be constructed by linking a plurality of computers. As described above, the production management system 2, the manufacturing execution system 3, and the manufacturing factory 5 can implement the injection molding condition generation system 1 by executing some or all of functions by the operator without using dedicated software or hardware.

The computer 10 includes, for example, an arithmetic device 11, a memory 12, a memory device 13, an input device 14, an output device 15, a communication device 16, and a medium interface unit 17. The devices 11 to 17 are connected by a communication path CN1. The communication path CN1 is, for example, an internal bus, a local area network (LAN), or the like.

The arithmetic device 11 includes, for example, a microprocessor. The arithmetic device 11 is not limited to the microprocessor, and may include, for example, a digital signal processor (DSP) and a graphics processing unit (GPU). The arithmetic device 11 implements the functions 21, 31 to 35, 401 to 417, 51, 52, and 60 as the injection molding condition generation system 1 by reading a computer program recorded in the memory device 13 into the memory 12 and executing the computer program.

The memory device 13 is a device that memorizes the computer program and data, and includes, for example, a rewritable memory medium such as a flash memory or a hard disk. The memory device 13 stores a computer program for implementing a graphical user interface (GUI) unit 60 that provides a GUI to the operator and the computer program for implementing the above functions 21, 31 to 35, 401 to 417, 51, and 52.

The input device 14 is a device by which the operator inputs information to the computer 10. Examples of the input device 14 include a voice instruction device and a pointing device such as a keyboard, a touch panel, and a mouse (all not shown). The output device 15 is a device by which the computer 10 outputs the information. Examples of the output device 15 include a display, a printer, and a voice synthesis device (all not shown).

The communication device 16 is a device that causes an external information processing device to communicate with the computer 10 via a communication path CN2. Examples of the external information processing device (not shown) include an external memory device 19 in addition to a computer. The computer 10 can read data (information unique to computer, a production result, and the like) and a computer program recorded in the external memory device 19. The computer 10 can also transmit and memorize all or a part of the computer program and the data memorized in the memory device 13 into the external memory device 19.

The medium interface unit 17 is a device for reading from and writing to an external recording medium 18. Examples of the external recording medium 18 include a universal serial bus (USB) memory, a memory card, and a hard disk. All or part of the computer program and the data memorized in the memory device 13 from the external recording medium 18 may be transferred and memorized into the external recording medium 18.

Figure 3:
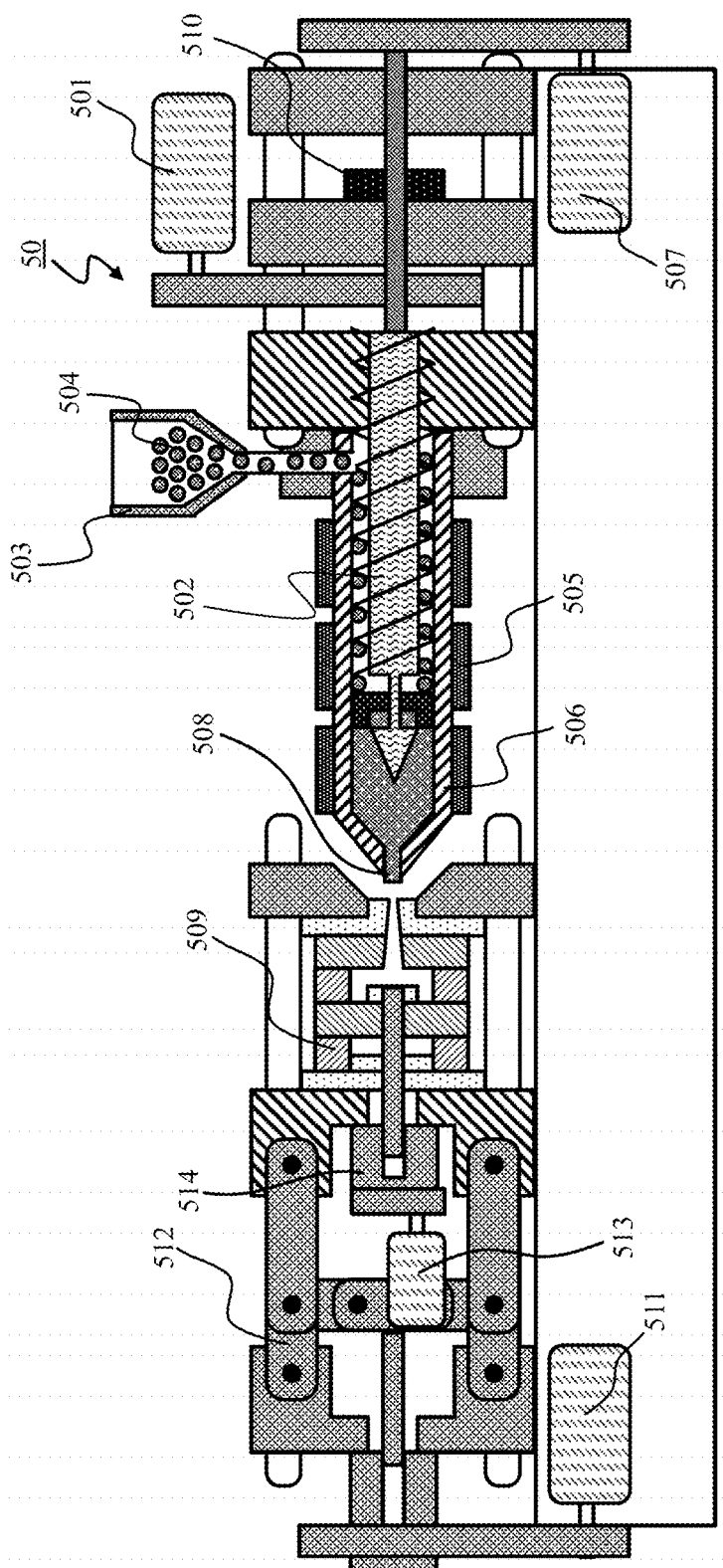
FIG. 3 is a conceptual diagram of the injection molding machine.

FIG. 3 is a conceptual diagram of the injection molding machine 50. Processes of an injection molding process will be described with reference to FIG. 3. In the present embodiment, a molding phenomenon refers to a series of phenomena occurring in the injection molding process. In the present embodiment, the injection molding process is roughly divided into a measurement and plasticization process, an injection and pressure-holding process, a cooling process, and a takeout process.

In the measurement and plasticization process, a screw 502 is retracted using a plasticizing motor 501 as a driving force, and resin pellets 504 are supplied into a cylinder 505 from a hopper 503. A resin is plasticized into a uniform molten state by heating by a heater 506 and rotating the screw 502. By setting a back pressure and a rotation speed of the screw 502, a density of the molten resin and a breaking degree of a reinforcing fiber change, and the changes affect the quality of the molded article.

In the injection and pressure-holding process, the screw 502 is advanced using an injection motor 507 as a driving force, and the molten resin is injected into a mold 509 via a nozzle 508. Cooling from a wall surface of the mold 509 and shear heating caused by a flow act in parallel on the molten resin injected into the mold 509. That is, the molten resin flows in the mold 509 while being subjected to a cooling action and a heating action. When a mold clamping force, which is a force for closing the mold 509, is small, a minute mold opening occurs after solidification of the molten resin, and the quality of the molded article is affected by the minute gap.

In the cooling process, the molten resin is cooled to a solidification temperature or lower by the mold 509 held at a constant temperature. A residual stress generated in the cooling process affects the quality of the molded article. The residual stress is generated due to anisotropy of a material property caused by the flow in the mold, density distribution due to pressure-holding, and unevenness in a molding shrinkage ratio.

In the takeout process, the mold 509 is opened by driving a mold clamping mechanism 512 using a motor 511 as a driving force for opening and closing the mold 509. In a case in which the solidified molded article is taken out from the mold 509 by driving an ejector mechanism 514 using an ejector motor 513 as a driving force, when a sufficient ejecting force does not uniformly act on the molded article, the residual stress remains in the molded article, which affects the quality of the molded article.

In the injection molding machine 50, a pressure control is performed such that a pressure value caused by a load cell 510 approaches a pressure value in an input molding condition. A temperature of the cylinder 505 is controlled by a plurality of heaters 506. A shape of the screw 502, a shape of the cylinder 505, and a shape of the nozzle 508 cause a different pressure loss for each injection molding machine. Accordingly, a pressure at a resin inflow port of the mold 509 is a value lower than that of the pressure indicated by the molding condition input to the injection molding machine. Further, due to an arrangement of the heaters 506 and the shear heating of the resin in a nozzle portion, a resin temperature in the resin inflow port of the mold 509 may be different from a resin temperature indicated by the molding condition input to the injection molding machine.

A configuration of an injection mechanism (the shape of the screw 502, the shape of the cylinder 505, the shape of the nozzle 508, the arrangement of the heaters 506, and the like) may be different for each injection molding machine, which becomes a machine difference and affects the quality of the molded article.

The quality of the molded article is evaluated by shape properties (weight, length, thickness, sink, burr, warp, and the like), surface properties such as appearance defect (weld, silver, burn, whitening, scratch, air bubbles, peeling, flow mark, jetting, color, gloss, and the like), and mechanical and optical properties (tensile strength, impact resistance, transmittance, and the like).

The shape properties have a strong correlation between the mold clamping force and a history of the pressure and the temperature in the injection and pressure-holding process and the cooling process. Regarding the surface properties, generation factors are different with respect to a generated phenomenon, and, for example, a flow mark and jetting have a strong correlation with the temperature and the speed of the resin in the injection process. For example, in a case of the tensile strength, an evaluation in a break test is required, and thus the mechanical and optical properties are often evaluated by other quality indicators correlated with a weight or the like.

A parameter corresponding to each process of the injection molding process is set in the molding condition. Regarding the measurement and plasticization process, a measurement position, a suck-back, a back pressure, a back-pressure speed, a rotation speed, and the like are set. Regarding the injection and pressure-holding process, the pressure, the temperature, time, and the speed are set, respectively. Regarding the injection and pressure-holding process, a screw position (VP switching position) at which the injection and the pressure are switched and the mold clamping force of the mold 509 are also set. Regarding the cooling process, cooling time after the pressure-holding is set. As the parameter related to the temperature, the temperature of the plurality of heaters 506, a temperature and a flow rate of a refrigerant for cooling the mold 509, and the like are set.

Figure 4:
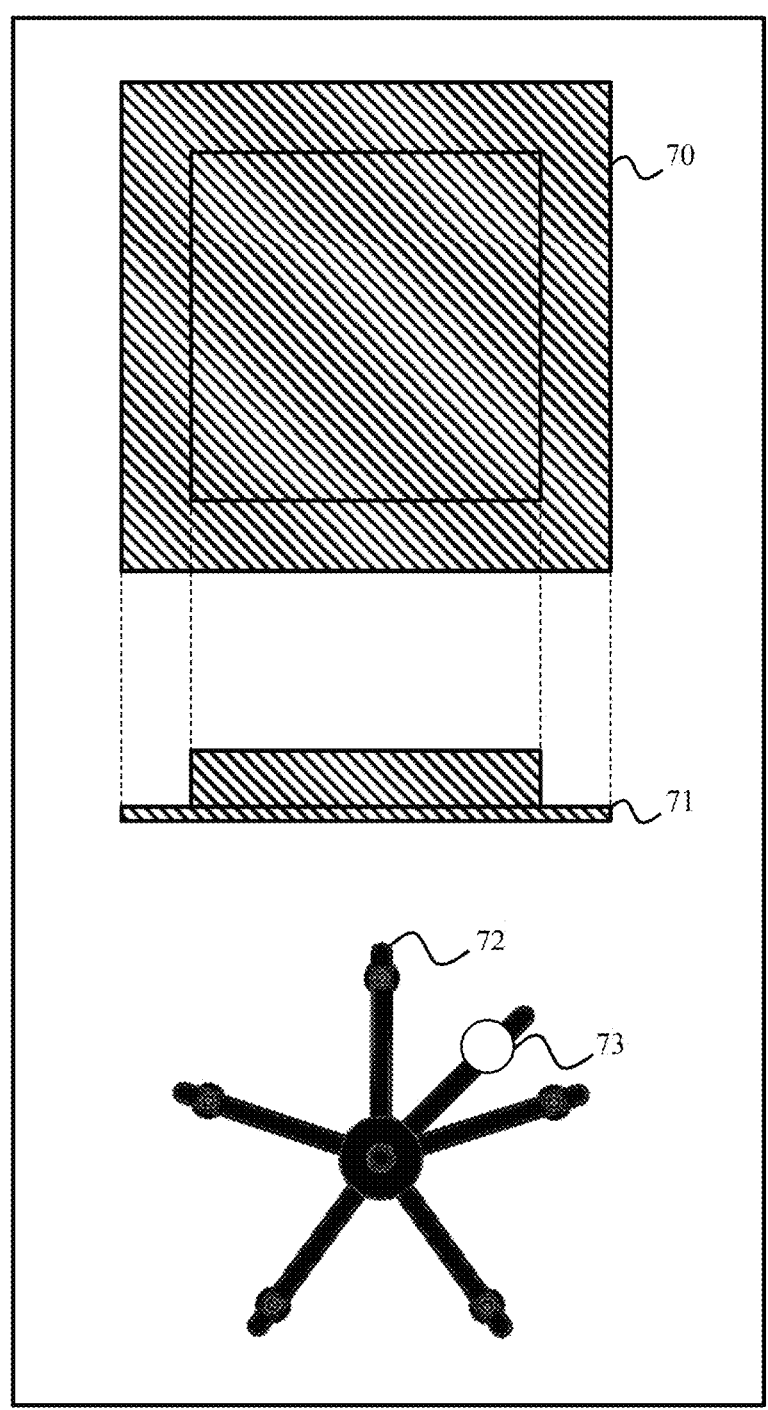
FIG. 4 is a conceptual diagram of a mold used in an experiment for verifying optimization of a molding condition.

FIG. 4 shows an outline of an experiment used in a test for verifying optimization of the molding condition according to the present embodiment. FIG. 4 shows a top view 70 of a product portion, a side view 71 of the product portion, and a top view 72 of a runner portion. The mold has a structure in which the resin flows from the runner portion into the product portion in a 5-point pin gate manner. In an actual molding experiment, a pressure sensor and a resin sensor (all not shown) were disposed in a sensor disposition portion 73 of a runner, and temporal changes were acquired. As a material used for molding, polypropylene (PP) was used. As the injection molding machine, an electric injection molding machine having a maximum mold clamping force of 150$t$ and a screw diameter of 44 mm was used.

Figure 5:
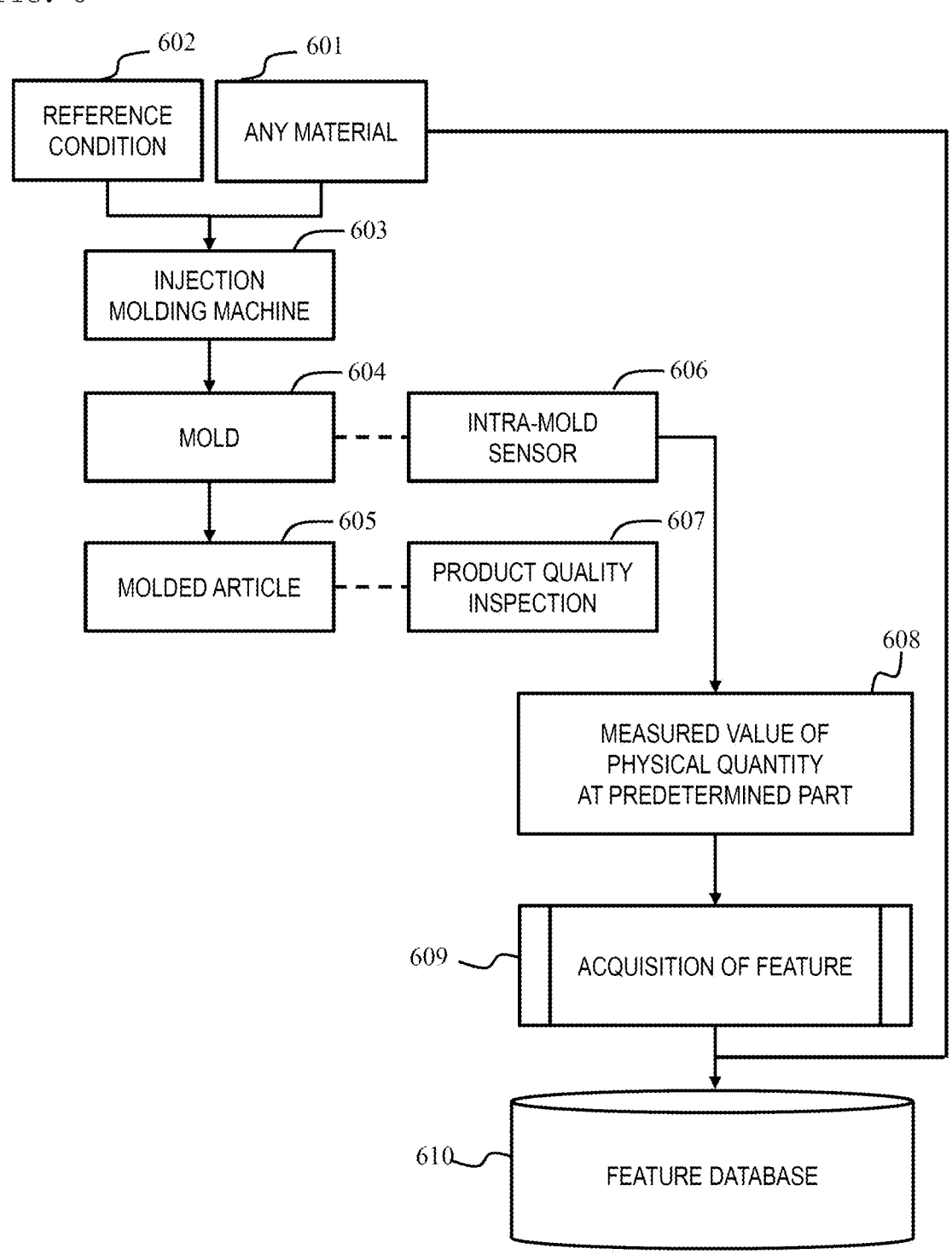
FIG. 5 is a block diagram of extracting a feature from a physical quantity obtained from a sensor and recording the extracted feature in a feature database.

FIG. 5 is a block diagram illustrating an example of a method of acquiring the material information by extracting the feature in the feature extraction unit 402 with respect to the physical quantity obtained from the sensor 58 and recording the extraction result in the feature database 403.

Acquisition information on the material information illustrated in FIG. 5 is realized using either a "sensor-equipped mold" or a "sensor-embedded mold" in which a sensor for measuring a predetermined physical quantity is provided at a predetermined position.

First, with respect to any material 601, a physical quantity at a predetermined part in the mold is acquired by inputting a reference molding condition 602 that is a fixed molding condition to an actual injection molding machine 603. Here, the injection molding machine 603 corresponds to the injection molding machine 50 shown in FIG. 3. In addition, the reference condition corresponds to a condition input to the injection molding machine when the injection molding process 55 shown in FIG. 1 is executed.

The physical quantity at the predetermined part in the mold is affected by the material information on the material itself to be used, a machine difference unique to the mold and the injection molding machine, and the molding condition. Therefore, by setting the reference condition 601 for each combination of mold and injection molding machine, the influence due to the machine difference and the molding condition can be prevented, and the material information unique to the material can be recorded in the feature database 610 as the feature of the physical quantity. That is, the reference condition may be changed for each combination of mold and injection molding machine.

In order to acquire a molding phenomenon in the actual injection molding machine 603, an intra-mold sensor 606 is used. By arranging the intra-mold sensor 606 at any position in a mold 604, it is possible to directly measure the molding phenomenon in the mold 604 and acquire an actual measured value 608 of the physical quantity correlated with the material information. The quality of the molded article 605 can be acquired by product quality inspection 607.

The feature is extracted from the obtained physical quantity (609). All the obtained physical quantities are acquired as a temporal change in the injection molding process, and thus are difficult to evaluate directly. Therefore, in the present embodiment, a quantitative evaluation of the material information is performed by acquiring the feature correlated with the material information from the temporal change of the physical quantity. By performing the molding under a common reference condition between the materials, the material information between the materials can be compared by comparing the feature between the materials.

Figure 6:
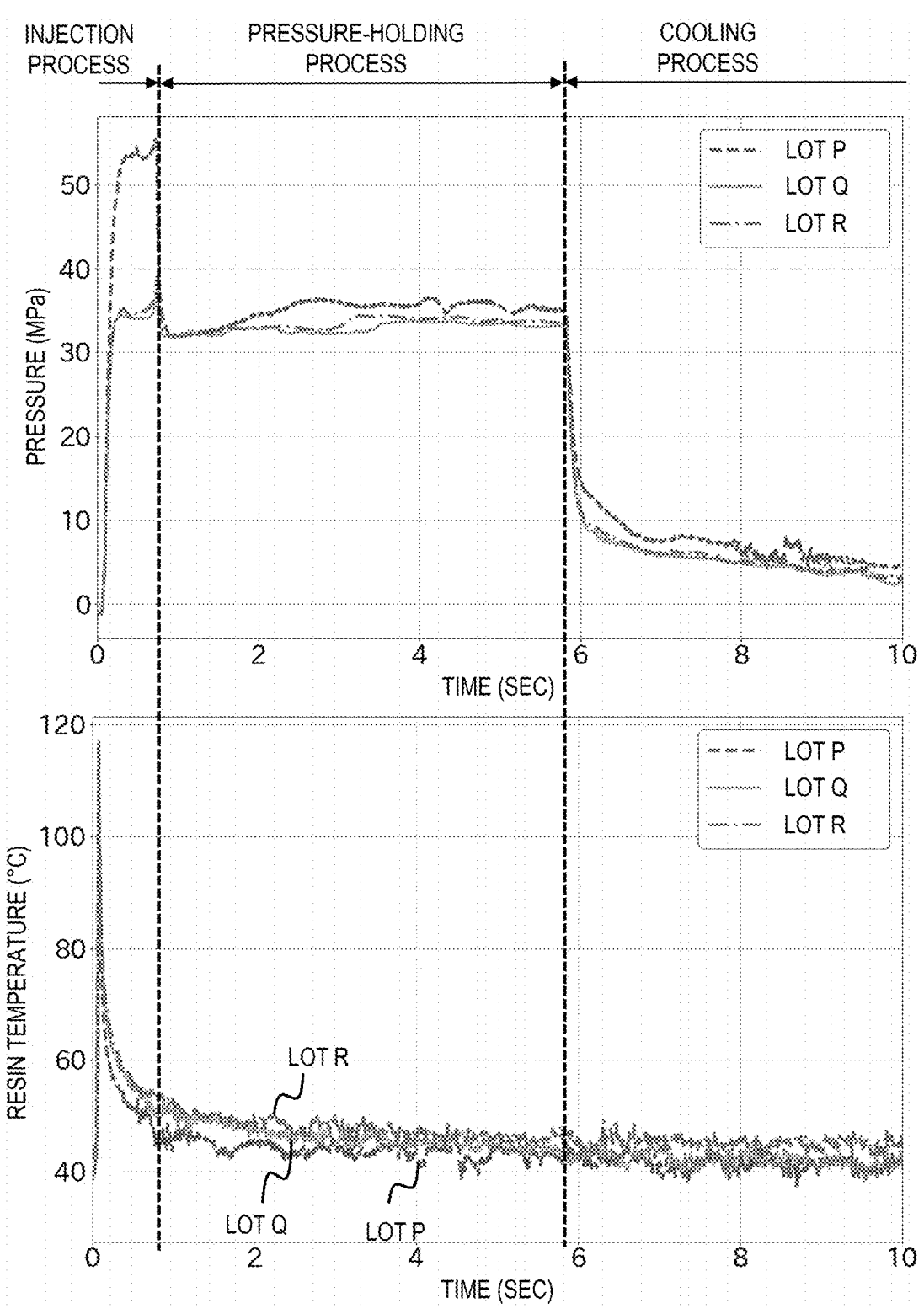
FIG. 6 is a graph showing a time series change in acquired data of a pressure sensor and a resin sensor.

A measurement result of an experimental example of verifying the optimization of the molding condition described with reference to FIG. 4 will be described with reference to FIGS. 6 and 7. FIG. 6 shows time series data of the pressure sensor and the resin sensor in the sensor disposition portion 73 of the runner when injection molding is performed under the reference condition for each of three PP material lots P, Q, and R having different delivery times. As shown in FIG. 6, variation of the time series data is different for each lot even under the same molding condition, and it can be confirmed that the time series data of the pressure sensor is affected by the material information unique to the material.

FIG. 7 is a result example in which a peak value, a maximum differential value, an integral value up to the peak value, and an integral value from the peak value are extracted as the feature from the pressure sensor and the resin temperature sensor for each material lot shown in FIG. 6 (in regard to the resin temperature sensor, a numerical value is omitted). According to FIG. 7, since the feature varies among lots, it can be confirmed that the extracted feature is affected by the material information. As described above, the feature extraction is performed for each lot, and the data set associated with the feature for each lot is referred to as a feature data set and is recorded in the feature database 403. In the present embodiment, as shown in FIG. 7, a total of eight-dimensional feature data set is used, among which four dimensions are used for each of the pressure sensor and the resin temperature sensor.

Hereinafter, a part of the mold at which the physical quantity is measured, a parameter of the physical quantity correlated with the resin information, and the feature will be described.

First, a part in the mold at which the physical quantity is measured (hereinafter, referred to as a measurement part) will be described. In any mold structure, it is preferable that the measurement part includes at least a sprue portion or the runner portion from the resin inflow port in the mold to an inside of a cavity.

The measurement part may be the inside of the cavity, which, however, requires to consider a loss of each physical quantity from the resin inflow port to the cavity when the material information unique to the material is derived by the above procedure. Therefore, it is necessary to ensure an analysis accuracy from the resin inflow port to the inside of the cavity. In addition, when the sensor is provided in the cavity to measure the physical quantity, a trace due to a shape of the sensor may remain in the molded article. Therefore, there is a restriction that the sensor cannot be introduced to a place where the appearance quality is required.

Therefore, in the present embodiment, the physical quantity correlated with the material information unique to the material can be obtained easily and with high accuracy using the sprue portion or the runner portion, which is close to the resin inflow port and whose appearance quality is not required, as the measurement part.

In addition to the sprue portion and the runner portion, the measurement part may be, for example, a part at which a property flow can be observed, such as a portion immediately below a gate in the cavity, a resin joining portion (a weld portion), and a flow terminal portion. In this case, the physical quantity correlated with the material information unique to the material can be obtained with higher accuracy from physical quantities obtained by a plurality of sensors.

For example, since a flow rate of the molten resin can be obtained based on passing time of a flow front at the plurality of measurement parts, it is possible to derive the material information about a flow speed of the molten resin. Further, a viscosity of the molten resin in the mold can be estimated by measuring a pressure and a temperature at this time.

An appropriate measurement part differs depending on the mold structure and the physical quantity to be measured. In any mold structure, if possible, it is preferable to set the sprue portion as the measurement part for a physical quantity other than a mold opening amount. In the present description, the expression "preferable" is merely used in a sense of being expected to achieve some advantageous effect, and does not mean that the configuration is essential.

In a side gate, a jump gate, a submarine gate, and a banana gate, a sensor is disposed on a runner portion immediately below the sprue portion, a runner portion immediately before the gate, or the like. In a case of a pin gate, since the pin gate has a three-plate structure, it takes time to arrange sensors, and the sensors are disposed on the runner portion or the like immediately below the sprue portion. In the case of the pin gate, the measurement part is a dummy runner that is not connected to the cavity and is provided for measurement. By providing the measurement dedicated part, a degree of freedom of mold design is improved. In the case of the pin gate, the dummy runner that is not connected to the cavity may be provided for measurement and used as the measurement part. By providing the measurement dedicated part, a degree of freedom of mold design is improved. In a case of a film gate or a fan gate, a sensor is provided on a runner portion before flowing into a gate portion.

Parameters to be measured as the above physical quantity will be described. In the present embodiment, in order to optimize the molding condition according to the material information, at least the pressure and the temperature are measured. In the measurement of the pressure and the temperature, for example, an intra-mold pressure sensor, a mold surface temperature sensor, a resin temperature sensor, and the like can be used. As the resin temperature sensor, either or both a contact temperature sensor such as a thermocouple and a non-contact temperature sensor such as an infrared radiation thermometer can be used. Both physical quantities of the pressure and the temperature also record the temporal change in the injection molding process.

The optimization system 1 of the injection molding condition may acquire a flow front speed and a flow front passage time in addition to the mold opening amount, the temperature, and the pressure. It is possible to obtain, from the sensor that detects the speed of the flow front and the passage of the flow front, information at the time when the flow front passes, instead of the temporal change in the injection molding process. When the flow front passage time is to be acquired, at least two or more sensors are provided, and the passage times of the resin between two points are compared. It is possible to evaluate an injection speed more accurately by detecting the speed and the passage time of the flow front.

The feature of the above physical quantity will be described. In the present embodiment, for example, a maximum value of the pressure (a peak value of the temporal change), an integral value, and a maximum value of the temperature (a peak value of the temporal change) can be used. It is also effective to acquire a maximum value of a time differential value with respect to the temporal change of the pressure. The maximum value of the time differential value of the pressure is correlated with an instantaneous viscosity of the material. The integral value of the pressure may be calculated separately in the injection process and the pressure-holding process. The integral value of the pressure in the injection process is correlated with an average viscosity of the material in the injection process.

When an infrared radiation resin temperature sensor is used, the maximum value of the time differential value may be acquired with respect to an output value of the temporal change of the temperature sensor in the injection process. The feature is correlated with the flow front speed of the molten resin. When the flow front speed is acquired, the flow front speed is used as a feature correlated with a flow speed as it is. When the flow front passage time is acquired, a flow speed is calculated based on the passage time between two points and used as a feature. It is possible to record the injection speed more accurately by recording a relation between the flow speed and a set value of the injection speed (a fixed value regardless of the material under the reference condition).

The process data set recorded in the process database 408 will be described with reference to FIG. 8. The process database 408 records data in which the quality of the molded article molded by the injection molding process 54 or the injection molding process 55, the molding condition input to the injection molding machine, the predetermined material unit, and the combination of injection molding machine and mold are associated with each other. The process data set is recorded for each combination of injection molding machine and mold.

In the present embodiment, the above material lots P, Q, and R were used, the weight of the molded article was set as the quality of the molded article, and a mold clamping pressure, a mold temperature, a molding nozzle temperature, the injection speed, a pressure-holding pressure, a V-P switching position, and the cooling time were set as parameters of the molding condition. Although parameters other than those described above may be added to the parameters of the molding condition or any one or more of the above parameters may be reduced, the parameters of the molding condition preferably include at least one or more parameters correlated with the quality of the molded article (in the case of the present embodiment, the weight of the molded article).

FIG. 8 shows an example of the process database recorded for each combination of injection molding machine and mold in the present embodiment. The molding condition, the material lots, and the weight of the molded article are associated with each other. Specifically, #1 shown in FIG. 8 shows that, as the parameters of the molding condition, the mold clamping pressure was set to 120 [t], the mold temperature was set to 30 [° C.], the molding nozzle temperature was set to 180 [° C.], the injection speed was set to 40 [mm/s], the pressure-holding pressure was set to 30 [kg/m2], the V-P switching position was set to 10 [mm], and the cooling time was set to 35 [s], and the average value of the weight of the molded article when a shot was performed a plurality of times using the lot P as the material lot was 62.83 [g]. Here, the molding condition and the material lots to be changed in the trial molding may be determined based on, for example, experimental design, or may be determined based on a result obtained by CAE simulation.

A method for molding condition optimization in the training and optimization system 4 will be described with reference to FIGS. 9 to 16. The training and optimization system 4 has two functions including an optimization mode and a training mode. In the optimization mode, the optimal molding condition that satisfies the required quality is generated with respect to the second material. Meanwhile, in the training mode, the trained dimension reduction model and the trained regression model for use in the optimization mode are generated.

Figure 9:
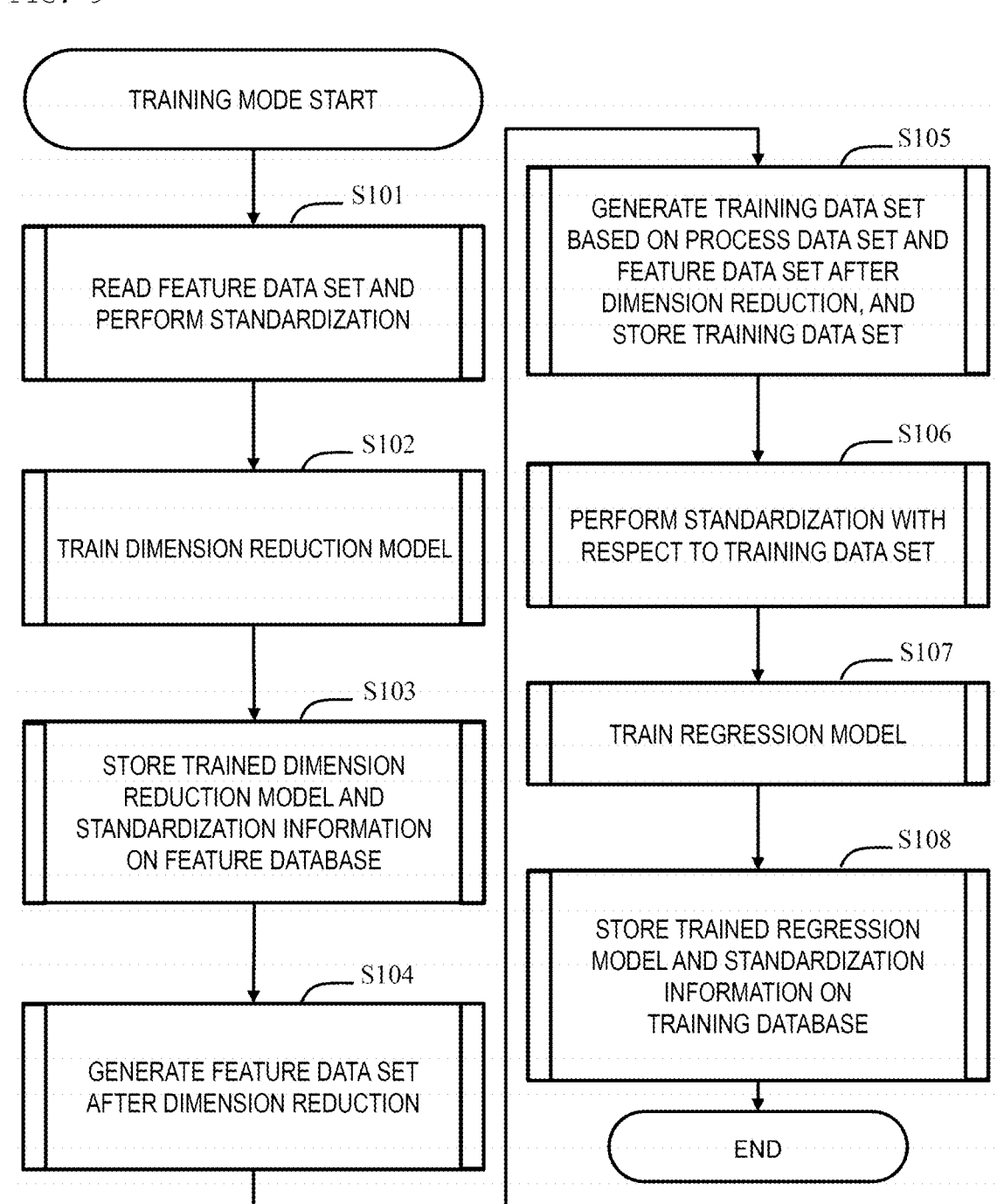
FIG. 9 is a flowchart of a training mode.

The training mode will be described with reference to FIGS. 9 to 13. FIG. 9 shows a flowchart of the training mode. When the training mode is started, first, the training and optimization system 4 reads a feature data set (FIG. 7 shows an example of the feature data set) from the feature database 403, and performs standardization (S101).

The standardization is processing of calculating an average value and a standard deviation of a data group for each column of a target data set, subtracting the average value from the numerical value of the data group, and dividing the average value by the standard deviation. Since the average of the data group of each column becomes 0 and the standard deviation becomes 1 by standardization, it is possible to eliminate an influence caused by a difference in units between the columns. In general, an effect is achieved by performing the standardization that an accuracy of training the dimension reduction model and the regression model is improved.

Next, the training and optimization system 4 trains the dimension reduction model with respect to the feature data set on which the standardization is performed (S102). In the present embodiment, the eight-dimensional feature data set is reduced to two dimensions using a UMAP as the dimension reduction model.

UMAP is a nonlinear dimension reduction model that converts position information between the input data to lower dimensional data than that of the input data while holding the position information. Other known models related to dimension reduction include principal component analysis and autoencoder, which may be used as the dimension reduction model of the feature data set.

Figure 10:
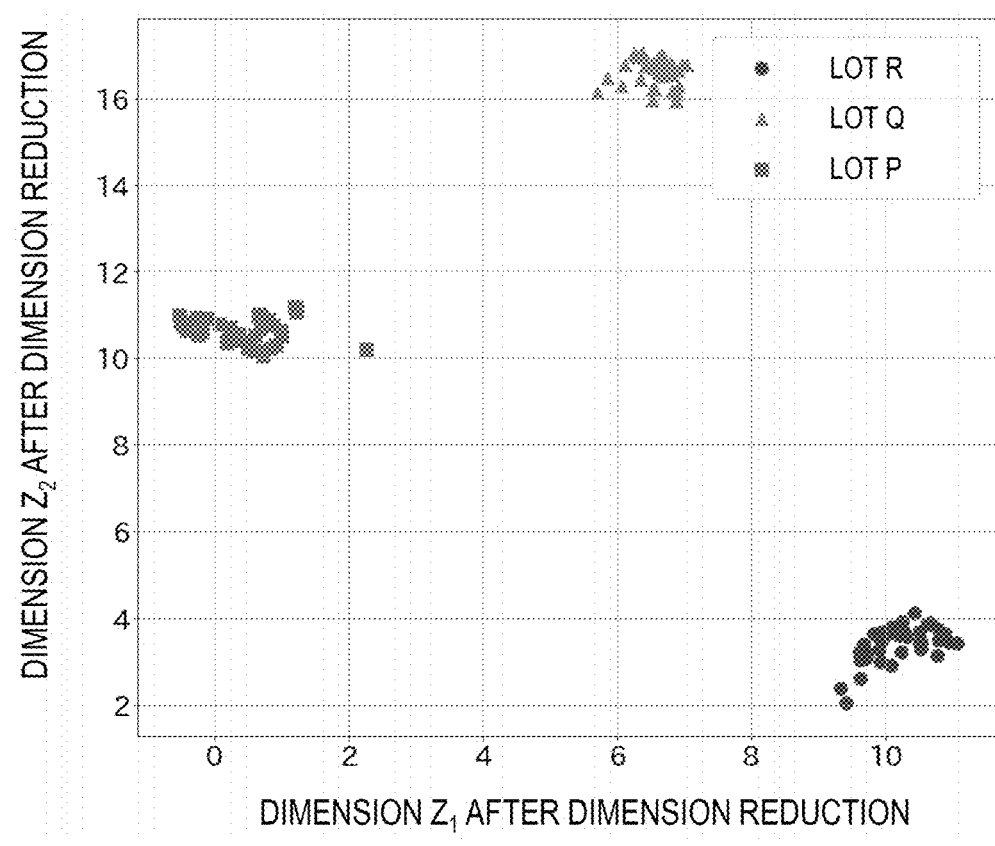
FIG. 10 is a graph showing an example of a result of converting a feature data set by a UMAP.

FIG. 10 is a graph obtained by converting each of the material lots P, Q, and R into a two-dimensional vector Z (Z1, Z2) using the UMAP as the dimension reduction model with respect to a feature data set obtained by molding each of the material lots P, Q, and R by 40 shots under the reference conditions in the injection molding process 55 (rank: eight, number of samples: 120), and plotting on a two-dimensional plane.

Each point shown in FIG. 10 corresponds to one shot, and shapes of the points are different depending on the material lot. From FIG. 10, it can be confirmed that since a distance between points of the same material lot is closer and a distance between points of different material lots is farther, the vector Z after the dimension reduction can express a difference in the material information between lots. That is, the trained dimension reduction model generates two-dimensional data correlated with the material information based on the eight-dimensional input data. In the present embodiment, the vector after the dimension reduction is set to two-dimensional, but may be reduced to any dimension higher than one dimension as long as lower than the input rank.

Turn back to FIG. 9. The training and optimization system 4 stores the trained dimension reduction model and the information related to the standardization in the trained dimension reduction model memory unit 406 (S103). The information related to the standardization means the average value and the standard deviation of each column of the feature data set.

As shown in FIG. 11, the training and optimization system 4 calculates, for each lot, an average value of each dimension of the vectors with respect to the vector Z after the dimension reduction obtained from the dimension reduction model, associates the average value with the lot, and generates the association as a feature data set after the dimension reduction (S104).

The training and optimization system 4 generates a training data set by reading the feature data set after the dimension reduction and the process data set stored in the process database 408 and combining the feature data set after the dimension reduction with the process data set stored in the process database 408 using the lot as a combination key, and records the training data set in the training database 412 (S105).

FIG. 12 shows an example of the training data set generated by combining the process data set shown in FIG. 8 with the feature data set after the dimension reduction shown in FIG. 11. From FIG. 12, it can be confirmed that a column of the material lot in the process data set shown in FIG. 8 is replaced with the feature Z (Z1, Z2) after the dimension reduction.

In a case in which the regression model is generated based on the training data set, when the rank of the training data set is unnecessarily large, there is a high possibility that a cost for training increases and an accuracy becomes unstable. Therefore, it is preferable to generate the training data set by combining the process data set with the data set after the dimension reduction. However, the training data set may be generated by combining the process data set and the feature data set not subjected to dimension reduction.

The training and optimization system 4 performs the standardization for each column of the data set, as performed in Step S101, with respect to the training data set (S106).

The training and optimization system 4 uses the data set after the standardization to generate, by machine learning, a regression model with the weight as the objective variable (output parameter), and with the mold clamping pressure, the mold temperature, the molding nozzle temperature, the injection speed, the pressure-holding pressure, the V-P switching position, the cooling time, Z1, and Z2 as the explanatory variables (input parameters) (S107).

In the present embodiment, the trained regression model is generated using the support vector regression, and a regression model such as linear regression, ridge regression, support vector machine, neural network, and random forest regression, or a regression model that is a combination thereof may be used as the regression model.

Figure 13:
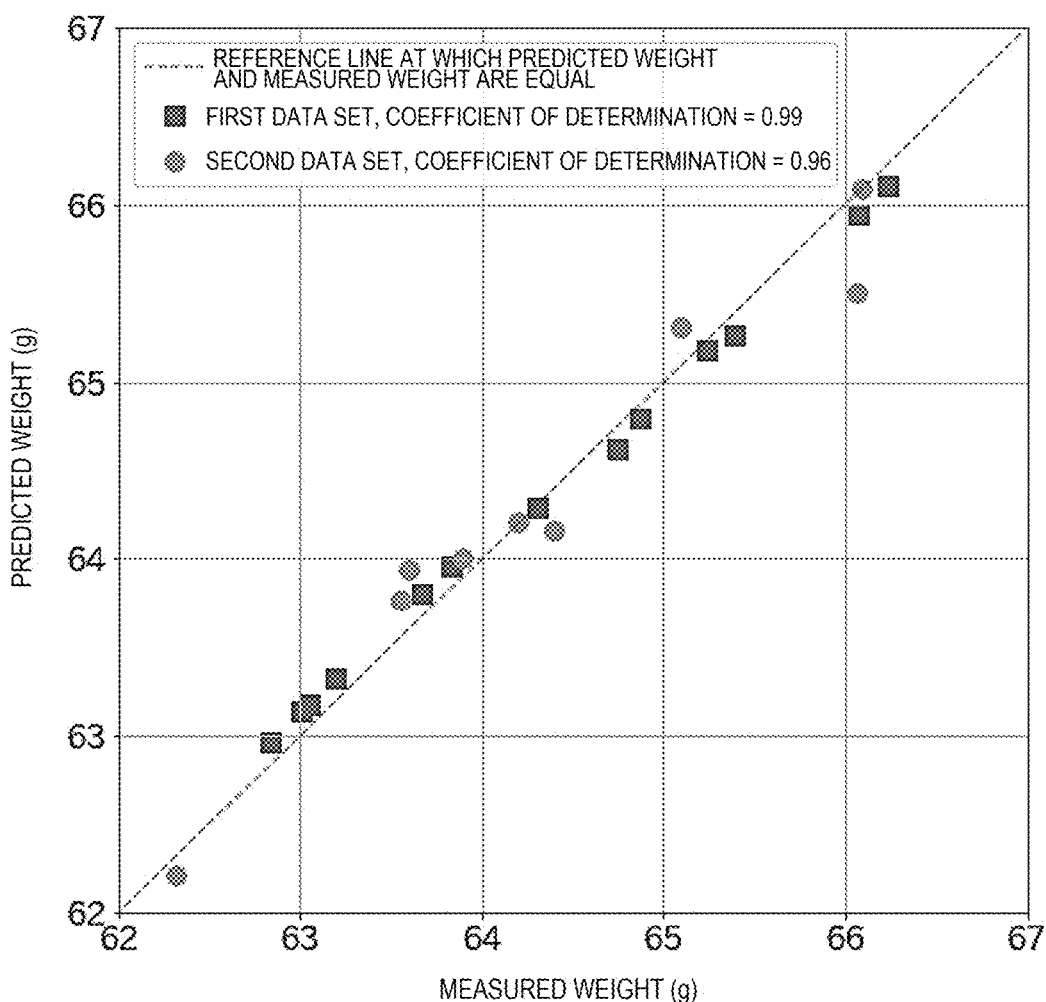
FIG. 13 is a graph showing performance evaluation of a trained regression model.

FIG. 13 shows a performance evaluation result of the trained regression model generated by the support vector regression in the present embodiment. The performance evaluation is performed to confirm effectiveness of the trained regression model generated in the present embodiment, and does not necessarily need to be performed for executing the optimization system 1 of the injection molding condition. Hereinafter, the performance evaluation method will be described.

The training data set shown in a data structure shown in FIG. 12 described above is divided into a first data set and a second data set by performing random extraction. In the performance evaluation, the trained regression model of the support vector regression is generated using the first data set. In the performance evaluation, a predicted value of the weight of the molded article is calculated by inputting the explanatory variables of the first data set and the second data set to the trained regression model.

FIG. 13 is a graph showing a relation between a measured weight and a predicted weight of the molded article. A horizontal axis indicates the measured weight of the molded article measured by the molded article quality inspection unit 57. A vertical axis indicates the predicted weight of the molded article based on the trained regression model. A dotted straight line indicates a reference line when the measured weight matches the predicted weight. A point closer to the reference line has a higher accuracy of the predicted value.

In general, a coefficient of determination is used as a representative index for quantitatively evaluating a prediction accuracy of the regression model. A coefficient of determination closer to 1 indicates a higher prediction accuracy of the regression model. From FIG. 13, it can be confirmed that the coefficients of determination of the first data set and the second data set are as high as 0.9 or more. In addition, a deviation between the coefficient of determination with respect to the second data set, which is not used for training the regression model, and the coefficient of determination with respect to the first data set, which is used for training the regression model, is small. Therefore, it is possible to confirm that a generalization performance of the trained regression model is also good. According to the evaluation, it is possible to confirm that a favorable model for predicting the weight of the molded article can be obtained using the training data set including the molding condition obtained by the trial molding in the injection molding process 54 and the feature Z after the dimension reduction correlated with the material information.

Turn back to FIG. 9. The training and optimization system 4 stores the trained regression model and the information related to the standardization in the trained regression model memory unit 415 (S108), and ends the training mode.

Figure 15:
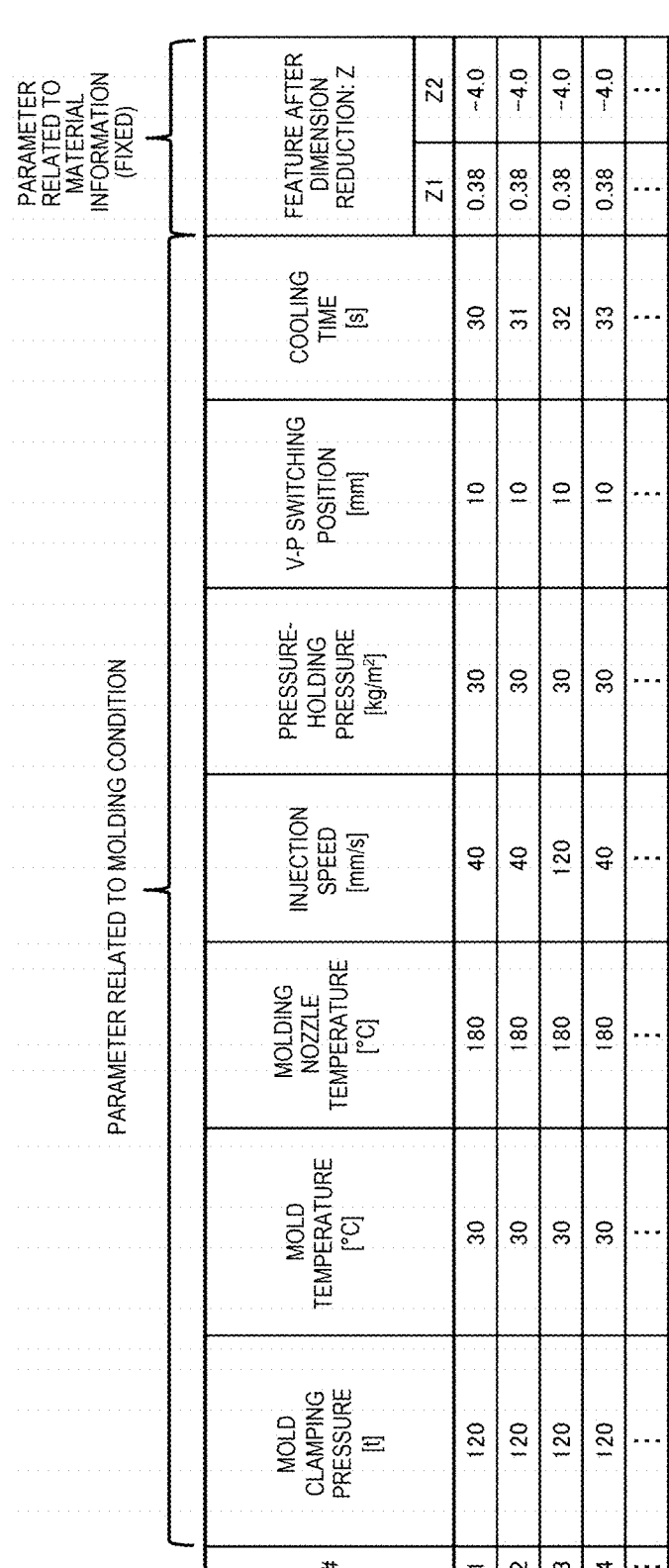
FIG. 15 is a diagram showing an example of a combination of explanatory variables in grid search.

The optimization mode in the training and optimization system 4 will be described with reference to FIGS. 14 to 16. In the optimization mode, the optimum molding condition for the second material to satisfy the required quality is generated based on the dimension reduction model and the trained regression model generated by the training mode, the feature data set of the second material, and an optimization algorithm.

FIG. 14 shows a flowchart of the optimization mode. In the optimization mode, a target weight of the molded article is read as required quality information from the manufacturing condition determination unit 31 (S201).

The training and optimization system 4 uses the second material to perform, for a predetermined number of shots, molding under the reference condition in the injection molding process 55 (S202). With respect to the molding result, the training and optimization system 4 creates the feature data set of the second material by the feature extraction unit 402 (S203).

The training and optimization system 4 reads, from the trained dimension reduction model memory unit 406, the trained dimension reduction model and standardization information on the feature database generated in the training mode (S204).

The training and optimization system 4 performs, on the feature data set of the second material, the standardization based on the standardization information on the feature database and the dimension reduction based on the trained dimension reduction model, and generates the feature after the dimension reduction of the second material (S205). In the embodiment example, the feature after the dimension reduction of the second material is (Z1, Z2)=(0.38, −4.0).

The training and optimization system 4 reads the trained regression model and the standardization information on the training database from the trained regression model memory unit 415 (S206), and optimizes the molding condition based on the target weight, the feature data set after the dimension reduction of the second material, the standardization information, the trained regression model, and a known optimization algorithm.

In the present embodiment, an example in which a grid search is used as the optimization algorithm will be described. In addition to the grid search, a gradient method, pseudo-annealing, a genetic algorithm, and Bayesian optimization may be used as the optimization algorithm. In addition, the optimization algorithms may be combined to optimize the molding condition.

A method for the optimization of the molding condition performed by grid search will be described with reference to Steps S207 to S209 shown in FIG. 14. First, an outline of grid search will be described.

Grid search is an optimization algorithm of setting a plurality of candidate values with respect to each parameter of the explanatory variables, calculating the predicted value of the objective variable using the trained regression model with respect to all combinations of explanatory variables configured by combining the candidate values of each parameter, and extracting a combination of explanatory variables having a smallest deviation between the predicted value and the target value. Grid search can not only obtain a global optimal solution robust against a problem in which a local feature is stronger than a global feature as compared with other general optimization algorithms, but also enables understanding of distribution of the objective variable in an entire space of the explanatory variables.

In the present embodiment, first, all combinations of the parameters of the explanatory variables of the regression model are created (S207). The parameters of the explanatory variables of the regression model according to the present embodiment include the parameters related to the molding condition (the mold clamping pressure, the mold temperature, the molding nozzle temperature, the injection speed, the pressure-holding pressure, the V-P switching position, and the cooling time) and the parameters related to the material information (the features Z1 and Z2 after the dimension reduction), as shown in the example of the training data set shown in FIG. 12.

With respect to the parameters related to the molding condition among the parameters of the explanatory variables, a maximum value and a minimum value of each parameter are determined, and a setting resolution of each parameter in the injection molding machine is set as a step width to create the candidate value. With respect to the parameter related to the material information, a combination of parameters of the explanatory variables is created using a value of the feature data set created in Step S205. With respect to the parameters related to the molding condition, for example, the mold clamping pressure changes by 1 [t] each time, with 120 [t] as the minimum value and 150 [t] as the maximum value. FIG. 15 shows an example of the combination of parameters created in the present embodiment. Accordingly, the optimum molding conditions when the second material is used can be generated by fixing the parameters related to the material information.

The training and optimization system 4 calculates the weight of the molded article using the trained regression model and the standardization information on the training database for each combination of parameters (S208).

In order to quantitatively evaluate the deviation between the predicted value and the target value, the training and optimization system 4 generates the molding condition closest to the target weight as the optimal condition by calculating absolute values of differences between the predicted value and the target value and sorting the absolute values of the differences in ascending order (S209).

For the quantitative evaluation of the deviation between the predicted value and the target value, in the present embodiment, the absolute values of the differences between the predicted value and the target value are set, but for example, another index representing the deviation between the predicted value and the target value may be set, such as a situation value of the difference between the predicted value and the target value.

In the present embodiment, the case in which the required quality is only the weight of the molded article is described, and the invention can also be applied to a case in which there is a plurality of required qualities such as the weight of the molded article and a dimension of the molded article. Any index representing the deviation between the target value, which is an object in the required quality, and the prediction can be set.

Figure 16:
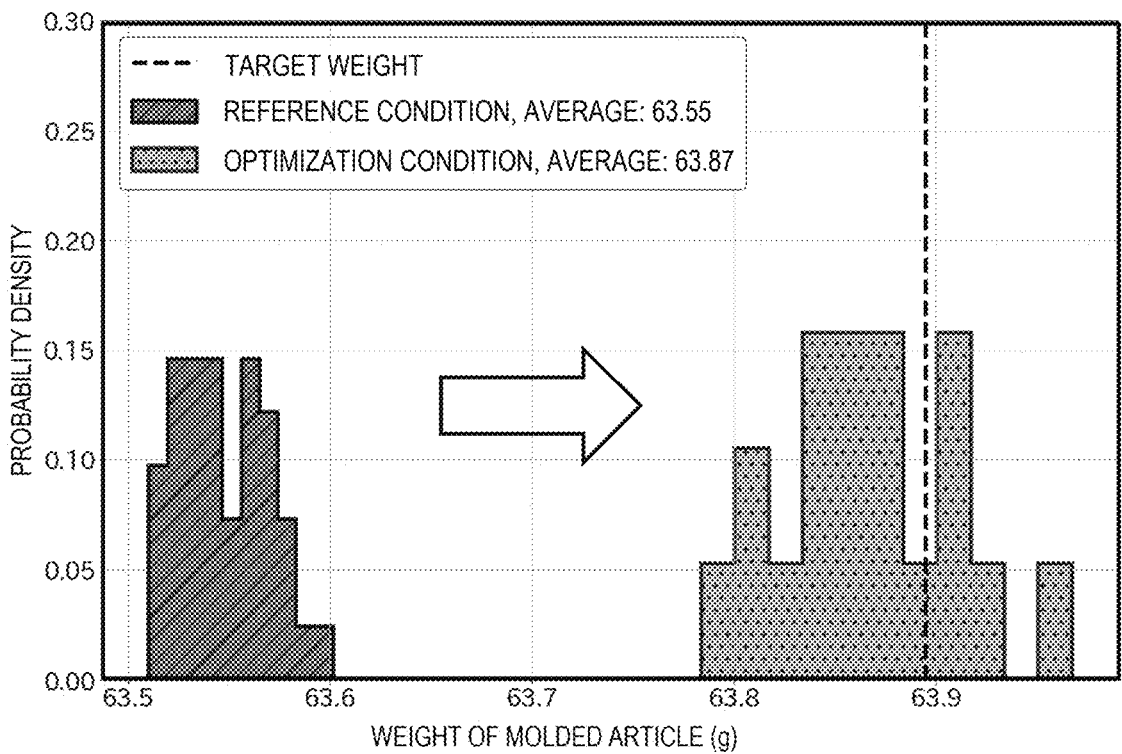
FIG. 16 is a weight distribution diagram of a molded article for confirming validity of an optimized molding condition.
Figure 17:
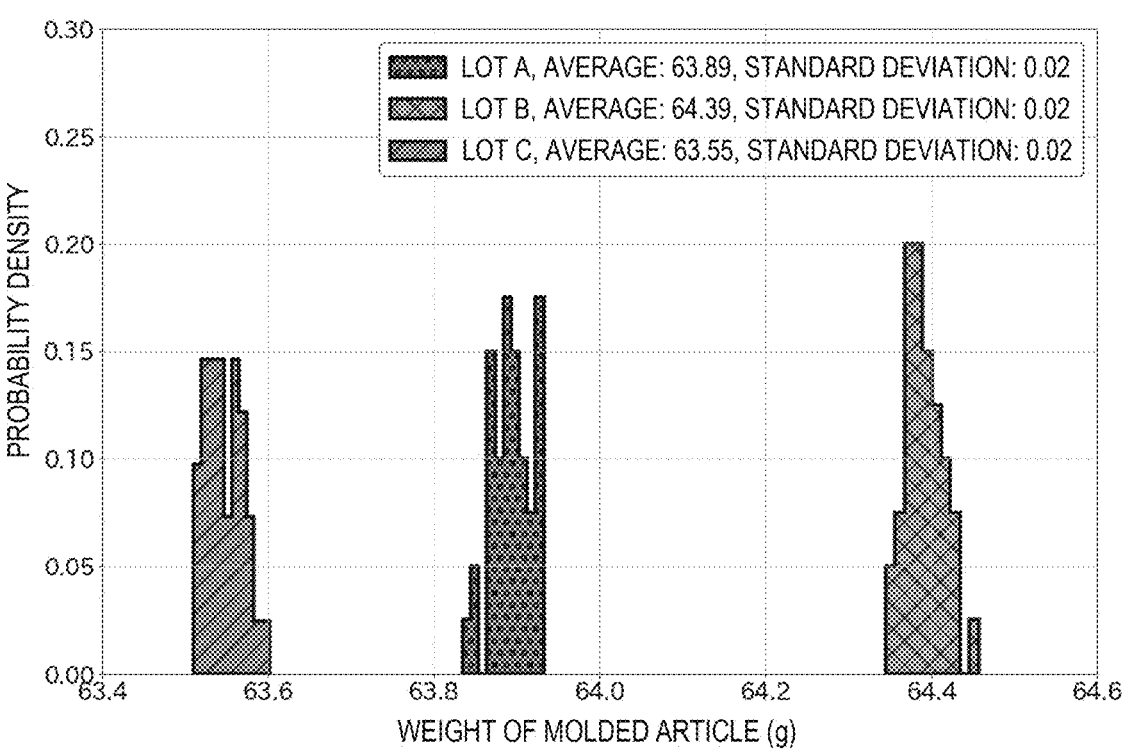
FIG. 17 is a weight distribution diagram of a molded article as a comparative example when recycled materials having different delivery times are molded under the same molding condition.

FIG. 16 shows, in the present embodiment, the weight of the molded article molded under the reference condition in the injection molding process 55 using the second material and the weight distribution of the molded article molded under the optimization condition generated for the second material.

The required quality (the weight of the molded article) input to the optimal condition generation unit 417 for generating the optimal molding condition is 63.89 [g], and is indicated by a dotted line parallel to the vertical axis in FIG. 16. In each distribution, the number of molded articles is 40 and is normalized by the number of each molded article, and the vertical axis indicates the probability density.

According to FIG. 16, the weight of the molded article is close to the required quality, and the validity of the generated molding condition can be confirmed. Even if the material property of the resin varies as described above, it is possible to optimize the molding condition that satisfies the required quality.

REFERENCE SIGNS LIST

1: injection molding condition generation system
2: production management system
3: manufacturing execution system
4: training and optimization system
5: manufacturing factory
31: manufacturing condition determination unit
32: production result memory unit
33: production result acquisition unit
34: manufacturing execution instruction unit
35: production result recording unit
401: sensor information recording unit
402: feature extraction unit
403: feature database
404: dimension reduction model training unit
405: trained dimension reduction model storage unit
406: dimension reduction model read unit
407: process data recording unit
408: process database
409: dimension reduction model read unit
410: dimension reduction execution unit
411: connection unit
412: training database
413: regression model training unit
414: regression model storage unit
415: trained regression model memory unit
416: regression model read unit
417: optimal condition generation unit
51: manufacturing execution unit
52: molding condition creation unit
57: molded article quality inspection unit
58: sensor

The invention claimed is:

1. An system for improving stability of molded-article quality across resin-lot variability and reducing the need for real-time controller adjustments during molding, the system comprising
a processor; and
a non-transitory memory storing executable instructions;
wherein the executable instruction when executed by the processor, cause the processor to: a
(a) execute a calibration molding cycle under a common reference injection-molding condition for a first resin material;
(b) acquire, during the calibration molding cycle, a time-series intra-mold sensor signal including at least intra-cavity pressure and/or temperature;
(c) compute a first material property value for the first resin material as a fluidity index calculated from at least one of: a peak value of the intra-mold sensor signal, an integral of the signal from injection start to the peak, an integral of the signal from injection start to mold opening, and a maximum differential value of the signal;

(d) generate an injection-molding condition for molding using the first resin material based on (i) a target value of a quality parameter related to a quality of a molded article, (ii) the first material property value, and (iii) a predetermined relational expression, indicating a relation among a material property value of a resin material, a plurality of injection molding conditions input to an injection molding machine, and a quality parameter related to a molded article molded by the injection-molding machine based on the material property value and the injection molding conditions, the predetermined relational expression having been generated from data accumulated in the memory in association with material property values of resin materials, injection-molding conditions, and quality parameters;

(e) evaluate candidate combinations of the plurality of injection-molding conditions with the predetermined relational expression and select a combination that minimizes a numerical deviation between a predicted quality parameter and the target value; and (f) output the generated injection-molding condition for execution by an injection-molding machine.

2. The system of claim 1, wherein the material property value used to generate the predetermined relational expression is computed for each predetermined unit of the resin material based on a feature of a measured value of an intra-mold sensor when molding is performed under the common reference injection-molding condition between the predetermined units.

3. The system oof claim 2, wherein the predetermined unit is a delivery unit (lot) of a recycled material supplied from a material supplier.

4. The system of claim 2, wherein the predetermined unit is a material supplier unit when the same type of virgin material is supplied from a plurality of different material suppliers.

5. The system of claim 1, wherein the predetermined relational expression is a regression equation generated using a machine-learning model, with the quality parameter related to the quality of the molded article when trial molding is performed on a trial resin material while changing the injection-molding condition as an output parameter, and with the injection molding condition and a material property value of the trial resin material as input parameters.

6. The system of claim 5, wherein the injection-molding conditions in the predetermined relational expression include at least one of: mold-clamping pressure, injection speed, temperature of a nozzle portion of the injection-molding machine, pressure-holding pressure, speed-pressure control switching position, or mold temperature.

7. The system of claim 5, wherein the quality parameter in the predetermined relational expression includes at least one of: an average value of a weight of the molded article, an average value of a dimension of the molded article, an average value of a warp amount of the molded article, or a defective rate of the molded article, in the predetermined unit.

8. The system of claim 5, wherein the feature includes at least one of a temperature, a speed, or a pressure.

9. The system of claim 5, wherein the feature includes a fluidity of the resin material, and the fluidity of the resin material is calculated based on at least one of: a peak value of the measured value of the intra-mold sensor, an integral value of the measured value from an injection start to a peak, an integral value of the measured value from the injection start to mold opening, or a maximum differential value of the measured value.

10. The system of claim 1, wherein reducing a rank of the features comprises applying Uniform Manifold Approximation and Projection (UMAP) to convert a plurality of features to a two-dimensional material property vector, and wherein the first material property value is an average of the two-dimensional vectors obtained from a plurality of calibration molding cycles for a common predetermined unit.

11. The system of claim 1, wherein the common reference injection-molding condition comprises a constant-speed filling segment followed by a constant pressure-holding segment of predefined duration at a fixed mold-temperature setpoint, and the intra-mold sensor is disposed at a sprue or runner portion of the mold.

12. The system of claim 1, wherein evaluating candidate combinations comprises performing a grid search over mold-clamping pressure, injection speed, nozzle-portion temperature, pressure-holding pressure, speed-pressure control switching position, and mold temperature, each varied over predefined discrete step sizes within machine bounds stored in the memory.

13. The system of claim 1, wherein selecting the combination that minimizes deviation further comprises, when multiple combinations yield an equal minimum deviation, selecting the combination that minimizes a predicted defective rate.

14. A computer-implemented method for improving stability of molded-article quality across resin-lot variability and reducing the need for real-time controller adjustments during molding, the method comprising:

(a) executing a calibration molding cycle under a common reference injection-molding condition for a first resin material;

(b) acquiring, during the calibration molding cycle, a time-series intra-mold sensor signal including at least intra-cavity pressure and/or temperature;

(c) computing a first material property value for the first resin material, as a fluidity index calculated from at least one of: a peak value of the intra-mold sensor signal, an integral of the signal from injection start to the peak, an integral of the signal from injection start to mold opening, and a maximum differential value of the signal;

(d) generating an injection-molding condition for molding using the first resin material based on (i) a target value of a quality parameter related to a quality of a molded article, (ii) the first material property value, and (iii) a predetermined relational expression indicating a relation among a material property value of a resin material, a plurality of injection molding conditions input to an injection molding machine, and a quality parameter related to a molded article molded by the injection-molding machine based on the material property value and the injection molding conditions, the predetermined relational expression having been generated from data accumulated in association with material property values of resin materials, injection molding conditions, and quality parameters;

(e) evaluating candidate combinations of the plurality of injection-molding conditions with the predetermined relational expression and selecting a combination that minimizes a numerical deviation between a predicted quality parameter and the target value; and (f) outputting the generated injection-molding condition for execution by an injection-molding machine.

15. The method of claim 14, further comprising measuring the quality parameter for a plurality of molded articles produced using the generated injection-molding condition and storing the measured quality parameter, the generated injection-molding condition, and the material property value as additional accumulated data associated with the predetermined unit for subsequent training of the predetermined relational expression.

\* \* \* \* \*